(12) United States Patent
Ben-Kiki et al.

(10) Patent No.: US 10,664,284 B2
(45) Date of Patent: *May 26, 2020

(54) APPARATUS AND METHOD FOR A HYBRID LATENCY-THROUGHPUT PROCESSOR

(71) Applicant: Intel Corporation, Santa Clara, CA (US)

(72) Inventors: Oren Ben-Kiki, Tel-Aviv (IL); Yuval Yosef, Hadera (IL); Ilan Pardo, Ramat-Hasharon (IL); Dror Markovich, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,075

(22) Filed: Feb. 28, 2019

(65) Prior Publication Data
US 2019/0196838 A1 Jun. 27, 2019

Related U.S. Application Data

(63) Continuation of application No. 15/226,875, filed on Aug. 2, 2016, now Pat. No. 10,255,077, which is a
(Continued)

(51) Int. Cl.
*G06F 9/38* (2018.01)
*G06F 9/30* (2018.01)
(Continued)

(52) U.S. Cl.
CPC ........ *G06F 9/3851* (2013.01); *G06F 9/30079* (2013.01); *G06F 9/3836* (2013.01);
(Continued)

(58) Field of Classification Search
CPC .. G06F 9/3851; G06F 9/30079; G06F 9/3855; G06F 9/3836; G06F 9/3861;
(Continued)

(56) References Cited

U.S. PATENT DOCUMENTS 4,943,915 A 7/1990 Wilhelm et al.
4,982,402 A 1/1991 Beaven et al.
(Continued)

FOREIGN PATENT DOCUMENTS

CN 1164704 A 11/1997
CN 1608246 A 4/2005
(Continued)

OTHER PUBLICATIONS

Non-Final Office Action from U.S. Appl. No. 13/729,931, dated Oct. 3, 2014, 13 pages.
(Continued)

*Primary Examiner* — Henry Tsai
*Assistant Examiner* — John B Roche
(74) *Attorney, Agent, or Firm* — Nicholson De Vos Webster & Elliott LLP

(57) ABSTRACT

An apparatus and method are described for executing both latency-optimized execution logic and throughput-optimized execution logic on a processing device. For example, a processor according to one embodiment comprises: latency-optimized execution logic to execute a first type of program code; throughput-optimized execution logic to execute a second type of program code, wherein the first type of program code and the second type of program code are designed for the same instruction set architecture; logic to identify the first type of program code and the second type of program code within a process and to distribute the first type of program code for execution on the latency-optimized execution logic and the second type of program code for execution on the throughput-optimized execution logic.

16 Claims, 23 Drawing Sheets

Related U.S. Application Data continuation of application No. 13/730,055, filed on Dec. 28, 2012, now Pat. No. 9,417,873.

(51) Int. Cl.
  *G06F 9/46* (2006.01)
  *G06F 15/80* (2006.01)
  *G06F 15/78* (2006.01)

(52) U.S. Cl.
  CPC .......... *G06F 9/3855* (2013.01); *G06F 9/3861* (2013.01); *G06F 9/3877* (2013.01); *G06F 9/46* (2013.01); *G06F 15/80* (2013.01); *G06F 15/7867* (2013.01); *G06F 15/7892* (2013.01)

(58) Field of Classification Search
  CPC .......... G06F 9/3877; G06F 9/46; G06F 15/80; G06F 15/7892; G06F 15/7867
  See application file for complete search history.

(56) References Cited

U.S. PATENT DOCUMENTS

| | | | |
|---|---|---|---|
| 5,276,798 A | 1/1994 | Peaslee et al. |
| 5,329,615 A | 7/1994 | Peaslee et al. |
| 5,371,849 A | 12/1994 | Peaslee et al. |
| 5,423,025 A | 6/1995 | Goldman et al. |
| 5,430,841 A | 7/1995 | Tannenbaum et al. |
| 5,550,988 A | 8/1996 | Sarangdhar et al. |
| 5,649,230 A | 7/1997 | Lentz |
| 5,890,010 A | 3/1999 | Nishigami |
| 6,061,711 A | 5/2000 | Song et al. |
| 6,081,849 A | 6/2000 | Born et al. |
| 6,105,127 A | 8/2000 | Kimura et al. |
| 6,148,326 A | 11/2000 | Born et al. |
| 6,247,040 B1 | 6/2001 | Born et al. |
| 6,275,497 B1 | 8/2001 | Varma et al. |
| 6,331,857 B1 | 12/2001 | Hussain et al. |
| 6,341,324 B1 | 1/2002 | Caulk, Jr. et al. |
| 6,397,240 B1 | 5/2002 | Fernando et al. |
| 6,725,416 B2 | 4/2004 | Dadurian |
| 6,742,104 B2 | 5/2004 | Chauvel et al. |
| 6,779,085 B2 | 8/2004 | Chauvel |
| 6,944,746 B2 | 9/2005 | So |
| 6,952,214 B2 | 10/2005 | Naegle et al. |
| 6,957,315 B2 | 10/2005 | Chauvel |
| 7,065,625 B2 | 6/2006 | Alderson |
| 7,079,147 B2 | 7/2006 | Wichman et al. |
| 7,082,508 B2 | 7/2006 | Khan et al. |
| 7,200,741 B1 | 4/2007 | Mine |
| 7,209,996 B2 | 4/2007 | Kohn et al. |
| 7,234,042 B1 | 6/2007 | Wilson |
| 7,302,627 B1 | 11/2007 | Mimar |
| 7,370,243 B1 | 5/2008 | Grohoski et al. |
| 7,480,838 B1 | 1/2009 | Wilkerson et al. |
| 7,545,381 B2 | 6/2009 | Huang et al. |
| 7,583,268 B2 | 9/2009 | Huang et al. |
| 7,598,958 B1 | 10/2009 | Kelleher |
| 7,676,649 B2 | 3/2010 | Rapp et al. |
| 7,746,350 B1 | 6/2010 | Danilak |
| 7,765,388 B2 | 7/2010 | Barrett et al. |
| 7,793,080 B2 | 9/2010 | Shen et al. |
| 7,865,675 B2 | 1/2011 | Paver et al. |
| 7,930,519 B2 | 4/2011 | Frank |
| 8,020,039 B2 | 9/2011 | Reid et al. |
| 8,055,872 B2 | 11/2011 | Biles et al. |
| 8,063,907 B2 | 11/2011 | Lippincott et al. |
| 8,082,426 B2 | 12/2011 | Paltashev et al. |
| 8,140,823 B2 | 3/2012 | Codrescu et al. |
| 8,141,102 B2 | 3/2012 | Aho et al. |
| 8,190,863 B2 | 5/2012 | Fossum et al. |
| 8,212,824 B1 | 7/2012 | Allen et al. |
| 8,230,442 B2 | 7/2012 | Aho et al. |
| 8,281,185 B2 | 10/2012 | Nussbaum et al. |
| 8,345,052 B1 | 1/2013 | Diard |
| 8,424,018 B2 | 4/2013 | Aho et al. |
| 8,683,175 B2 | 3/2014 | Ekanadham et al. |
| 8,776,084 B2 | 7/2014 | Aho et al. |
| 8,780,123 B2 | 7/2014 | Crow et al. |
| 8,959,311 B2 | 2/2015 | Akkar et al. |
| 9,003,102 B2 | 4/2015 | Lassa |
| 9,003,166 B2 | 4/2015 | Sinha et al. |
| 9,015,443 B2 | 4/2015 | Aho et al. |
| 9,053,025 B2 | 6/2015 | Ben-Kiki et al. |
| 9,086,813 B2 | 7/2015 | Zeng et al. |
| 9,189,261 B2 | 11/2015 | Masood |
| 9,275,491 B2 | 3/2016 | Bolz et al. |
| 9,361,116 B2 | 6/2016 | Ben-Kiki et al. |
| 9,396,020 B2 | 7/2016 | Ginzburg et al. |
| 9,417,873 B2 * | 8/2016 | Ben-Kiki ............ G06F 9/30079 |
| 9,703,603 B1 | 7/2017 | Roy et al. |
| 10,255,077 B2 * | 4/2019 | Ben-Kiki ............ G06F 9/30079 |
| 2001/0042210 A1 | 11/2001 | Blaker et al. |
| 2002/0004904 A1 | 1/2002 | Blaker et al. |
| 2002/0069327 A1 | 6/2002 | Chauvel |
| 2002/0178349 A1 | 11/2002 | Shibayama et al. |
| 2003/0028751 A1 | 2/2003 | McDonald et al. |
| 2003/0093648 A1 | 5/2003 | Moyer |
| 2003/0126416 A1 | 7/2003 | Marr et al. |
| 2003/0135718 A1 | 7/2003 | Dewitt et al. |
| 2003/0135719 A1 | 7/2003 | Dewitt et al. |
| 2003/0135789 A1 | 7/2003 | Dewitt et al. |
| 2003/0212874 A1 | 11/2003 | Alderson |
| 2004/0055003 A1 | 3/2004 | Sundaram et al. |
| 2004/0073836 A1 | 4/2004 | Shimada |
| 2004/0111594 A1 | 6/2004 | Feiste et al. |
| 2004/0160446 A1 | 8/2004 | Gosalia et al. |
| 2004/0215444 A1 | 10/2004 | Patel et al. |
| 2004/0227763 A1 | 11/2004 | Wichman et al. |
| 2004/0268071 A1 | 12/2004 | Khan et al. |
| 2005/0149937 A1 | 7/2005 | Pilkington |
| 2005/0166038 A1 | 7/2005 | Wang et al. |
| 2005/0257186 A1 | 11/2005 | Zilbershlag |
| 2006/0050077 A1 | 3/2006 | D'Amora et al. |
| 2006/0095721 A1 | 5/2006 | Biles et al. |
| 2006/0095807 A1 | 5/2006 | Grochowski et al. |
| 2006/0200802 A1 | 9/2006 | Mott et al. |
| 2006/0288193 A1 | 12/2006 | Hsu |
| 2007/0050594 A1 | 3/2007 | Augsburg et al. |
| 2007/0103476 A1 | 5/2007 | Huang et al. |
| 2007/0226464 A1 | 9/2007 | Chaudhry et al. |
| 2008/0005546 A1 | 1/2008 | Wang et al. |
| 2008/0052532 A1 | 2/2008 | Akkar et al. |
| 2008/0104425 A1 | 5/2008 | Gunther et al. |
| 2008/0222383 A1 | 9/2008 | Spracklen et al. |
| 2009/0019264 A1 | 1/2009 | Correale, Jr. et al. |
| 2009/0024836 A1 | 1/2009 | Shen et al. |
| 2009/0141034 A1 | 6/2009 | Pryor et al. |
| 2009/0144519 A1 | 6/2009 | Codrescu et al. |
| 2009/0150620 A1 | 6/2009 | Paver et al. |
| 2009/0150722 A1 | 6/2009 | Reid et al. |
| 2009/0198966 A1 | 8/2009 | Gschwind et al. |
| 2009/0216958 A1 | 8/2009 | Biles et al. |
| 2009/0254907 A1 | 10/2009 | Neary |
| 2009/0259996 A1 | 10/2009 | Grover et al. |
| 2009/0309884 A1 | 12/2009 | Lippincott et al. |
| 2010/0058356 A1 | 3/2010 | Aho et al. |
| 2010/0153686 A1 | 6/2010 | Frank |
| 2010/0274972 A1 | 10/2010 | Babayan et al. |
| 2010/0332901 A1 | 12/2010 | Nussbaum et al. |
| 2011/0040924 A1 | 2/2011 | Selinger |
| 2011/0047533 A1 | 2/2011 | Gschwind |
| 2011/0072234 A1 | 3/2011 | Chinya et al. |
| 2011/0093637 A1 | 4/2011 | Gupta et al. |
| 2011/0145778 A1 | 6/2011 | Chen |
| 2011/0271059 A1 | 11/2011 | Aho et al. |
| 2012/0023314 A1 | 1/2012 | Crum et al. |
| 2012/0036339 A1 | 2/2012 | Frazier et al. |
| 2012/0124588 A1 | 5/2012 | Sinha et al. |
| 2012/0131309 A1 | 5/2012 | Johnson et al. |
| 2012/0139926 A1 | 6/2012 | Clohset et al. |
| 2012/0159090 A1 | 6/2012 | Andrews et al. |
| 2012/0166777 A1 | 6/2012 | McLellan et al. |
| 2012/0239904 A1 | 9/2012 | Ekanadham et al. |

(56) References Cited

U.S. PATENT DOCUMENTS

| | | | |
|---|---|---|---|
| 2012/0311360 A1 | 12/2012 | Balasubramanian et al. |
| 2012/0331310 A1 | 12/2012 | Burns et al. |
| 2013/0054871 A1 | 2/2013 | Lassa |
| 2013/0159630 A1 | 6/2013 | Lichmanov |
| 2013/0167154 A1 | 6/2013 | Peng et al. |
| 2013/0179884 A1 | 7/2013 | Masood |
| 2013/0205119 A1 | 8/2013 | Rajwar et al. |
| 2013/0332937 A1 | 12/2013 | Gaster et al. |
| 2014/0025822 A1 | 1/2014 | Guha et al. |
| 2014/0176569 A1 | 6/2014 | Meixner |
| 2014/0189317 A1 | 7/2014 | Ben-Kiki et al. |
| 2014/0189333 A1 | 7/2014 | Ben-Kiki et al. |
| 2014/0282580 A1 | 9/2014 | Zeng et al. |
| 2014/0331236 A1 | 11/2014 | Mitra et al. |
| 2014/0344815 A1 | 11/2014 | Ginzburg et al. |
| 2015/0317161 A1 | 11/2015 | Murphy |
| 2016/0246597 A1 | 8/2016 | Ben-Kiki et al. |
| 2016/0335090 A1 | 11/2016 | Weissmann et al. |
| 2016/0342419 A1 | 11/2016 | Oren-Kiki et al. |
| 2017/0017491 A1 | 1/2017 | Ben-Kiki et al. |
| 2017/0017492 A1 | 1/2017 | Ben-Kiki et al. |
| 2017/0109281 A1 | 4/2017 | Weissmann et al. |
| 2017/0109294 A1 | 4/2017 | Weissmann et al. |
| 2017/0153984 A1 | 6/2017 | Weissmann et al. |

FOREIGN PATENT DOCUMENTS

| | | | |
|---|---|---|---|
| CN | 1981280 A | 6/2007 |
| CN | 101083525 A | 12/2007 |
| CN | 101452423 A | 6/2009 |
| CN | 101667138 A | 3/2010 |
| CN | 101855614 A | 10/2010 |
| CN | 102270166 A | 12/2011 |
| CN | 102314671 A | 1/2012 |
| CN | 102567556 A | 7/2012 |
| CN | 102741806 A | 10/2012 |
| CN | 102741826 A | 10/2012 |
| WO | 2013147887 A1 | 10/2013 |
| WO | 2014105128 A1 | 7/2014 |
| WO | 2014105152 A1 | 7/2014 |

OTHER PUBLICATIONS

Non-Final Office Action from U.S. Appl. No. 13/730,055 dated Jul. 27, 2015, 16 pages.
Non-Final Office Action from U.S. Appl. No. 13/730,143, dated Apr. 17, 2017, 36 pages.
Non-Final Office Action from U.S. Appl. No. 13/730,143 dated Aug. 11, 2015, 13 pages.
Non-Final Office Action from U.S. Appl. No. 13/730,719, dated May 13, 2015, 11 pages.
Non-Final Office Action from U.S. Appl. No. 13/730,719, dated Sep. 23, 2016, 19 pages.
Non-Final Office Action from U.S. Appl. No. 13/730,971 dated Jan. 6, 2015, 13 pages.
Non-Final Office Action from U.S. Appl. No. 13/730,971 dated Mar. 29, 2016, 15 pages.
Non-final Office Action from U.S. Appl. No. 15/145,748, dated Oct. 3, 2016, 22 pages.
Non-final Office Action from U.S. Appl. No. 15/145,748, dated Sep. 22, 2017, 30 pages.
Non-Final Office Action from U.S. Appl. No. 15/226,875, dated Oct.4, 2016, 25 pages.
Non-Final Office Action from U.S. Appl. No. 15/226,875, dated Sep. 12, 2017, 19 pages.
Non-Final Office Action from U.S. Appl. No. 15/281,944 dated Nov. 25, 2016, 23 pages.
Non-Final Office Action from U.S. Appl. No. 15/282,082 dated Aug. 2, 2017, 32 pages.
Non-Final Office Action from U.S. Appl. No. 15/282,082 dated Nov. 28, 2016, 26 pages.
Notice of Allowance from U.S. Appl. No. 15/226,875, dated Nov. 26, 2018, 17 pages.
Notice of Allowance from U.S. Appl. No. 15/145,748, dated Jun. 6, 2018, 15 pages.
Notice of Allowance for foreign counterpart Korea Application No. 10-2015-7012995, dated Jul. 20, 2016, 3 pages.
Notice of Allowance for foreign counterpart Korean Application No. 10-2015-7012861, dated Mar. 29, 2016, 3 pages.
Notice of Allowance from U.S. Appl. No. 13/729,915, dated Feb. 17, 2016, 10 pages.
Notice of Allowance from U.S. Appl. No. 13/729,931, dated Feb. 2, 2015, 05 pages.
Notice of Allowance from U.S. Appl. No. 13/730,055, dated Apr. 15, 2016, 10 pages.
Notice of Allowance from U.S. Appl. No. 13/730,055, dated Feb. 25, 2016, 8 pages.
Notice of Allowance from U.S. Appl. No. 13/730,719, dated Jul. 27, 2018, 11 pages.
Notice of Allowance from U.S. Appl. No. 13/730,719, dated Mar. 27, 2018, 19 pages.
Notice of Allowance from U.S. Appl. No. 13/730,719, dated May 18, 2017, 19 pages.
Notice of Allowance from U.S. Appl. No. 13/730,719, dated Nov. 13, 2017, 11 pages.
Notice of Allowance from U.S. Appl. No. 13/730,971, dated Jul. 28, 2017, 21 pages..
Notice of Allowance from U.S. Appl. No. 13/730,971, dated Mar. 11, 2019, 14 pages.
Notice of Allowance from U.S. Appl. No. 13/730,971, dated Mar. 27, 2018, 27 pages.
Notice of Allowance from U.S. Appl. No. 13/730,971 dated Oct. 7, 2016, 17 pages.
Notice of Allowance from U.S. Appl. No. 15/145,748, dated Aug. 1, 2018, 9 pages.
Notice of Allowance from U.S. Appl. No. 15/145,748, dated Mar. 12, 2018, 14 pages.
Notice of Allowance from U.S. Appl. No. 15/281,944, dated Dec. 8, 2017, 28 pages.
Notice of Allowance from U.S. Appl. No. 15/281,944, dated Jun. 27, 2018, 9 pages.
Notice of Allowance from U.S. Appl. No. 15/281,944, dated Mar. 26, 2018, 18 pages.
Notice of Allowance from U.S. Appl. No. 15/282,082, dated Dec. 20, 2017, 14 pages.
Notice of Allowance from U.S. Appl. No. 15/282,082, dated Mar. 30, 2018, 14 pages.
Notice of Preliminary Rejection for foreign counterpart Korean Application No. 10-2015-7012995, dated Feb. 22, 2016, 12 pages.
Notice of Preliminary Rejection from foreign counterpart Korean Patent Application No. KR1020167029366, dated Jan. 19, 2017, 13 pages.
Notice on Grant of Patent Right for Invention from foreign counterpart Chinese Patent Application No. 201380060918.9, dated Oct. 16, 2018, 4 pages.
Notice on Grant of Patent Right for Invention from foreign counterpart Chinese Patent Application No. 201380059874.8, dated Sep. 12, 2017, 4 pages.
Notice on Grant of Patent Right for Invention from foreign counterpart Chinese Patent Application No. 201380059899.8, dated May 4, 2018, 4 pages.
Notice on Grant of Patent Right for Invention from foreign counterpart Chinese Patent Application No. 201380059921.9, dated Jul. 18, 2018, 4 pages.
Notice on Grant of Patent Right for Invention from foreign counterpart Chinese Patent Application No. 201380062688.X, dated Sep. 3, 2018, 4 pages.
Notice on Grant of Patent Right for Invention from foreign counterpart Chinese Patent Application No. 201611088838.6, dated Oct. 23, 2018, 4 pages.
Office action for foreign counterpart Korean Application No. 10-2015-7012861, dated Dec. 11, 2015, 5 pages.
Office Action from foreign counterpart Chinese Patent Application No. 201380059874.8, dated May 16, 2017, 3 pages.

(56) References Cited

OTHER PUBLICATIONS

Office Action from Foreign Counterpart Chinese Patent Application No. 201380059874.8, dated Sep. 5, 2016, 17 pages.
Office Action from foreign counterpart Chinese Patent Application No. 201380059888, dated Feb. 7, 2017, 18 pages.
Abandonment from U.S. Appl. No. 13/730,143, dated Apr. 24, 2018, 3 pages.
Choi J., et al., "Impact of Cache Architecture and Interface on Performance and Area of FPGA-Based Processor/Parallel-Accelerator Systems," IEEE 20th International Symposium on Field-Programmable Custom Computing Machines, 2012, pp. 17-24.
Corrected Notice of Allowability from U.S. Appl. No. 15/145,748, dated Jul. 11, 2018, 9 pages.
Corrected Notice of Allowability from U.S. Appl. No. 15/282,082, dated Jul. 19, 2018, 9 pages.
Corrected Notice of Allowance from U.S. Appl. No. 15/282,082, dated Aug. 28, 2018, 10 pages.
Corrected Notice of Allowability from U.S. Appl. No. 15/226,875, dated Dec. 28, 2018, 4 pages.
Corrected Notice of Allowance from U.S. Appl. No. 15/145,748, dated Aug. 28, 2018, 12 pages.
Corrected Notice of Allowance from U.S. Appl. No. 15/281,944, dated Aug. 13, 2018, 13 pages.
Corrected Notice of Allowance from U.S. Appl. No. 15/281,944, dated Aug. 27, 2018, 9 pages.
Corrected Notice of Allowance from U.S. Appl. No. 15/282,082, dated Aug. 15, 2018, 14 pages.
Decision to Grant a Patent from foreign counterpart Korean Patent Application No. 10-2016-7029367, dated Apr. 26, 2017, 4 pages.
Final Office Action from U.S. Appl. No. 13/729,915, dated Dec. 2, 2015, 24 pages.
Final Office Action from U.S. Appl. No. 13/730,143, dated Aug. 7, 2017, 16 pages.
Final Office Action from U.S. Appl. No. 13/730,143, dated May 4, 2016, 18 pages.
Final Office Action from U.S. Appl. No. 13/730,719, dated Dec. 15, 2015, 10 pages.
Final Office Action from U.S. Appl. No. 13/730,971 dated Jul. 29, 2015, 14 pages.
Final Office Action from U.S. Appl. No. 15/145,748, dated Mar. 29, 2017, 41 pages.
Final Office Action from U.S. Appl. No. 15/226,875, dated Jun. 29, 2018, 26 pages.
Final Office Action from U.S. Appl. No. 15/226,875, dated May 17, 2017, 36 pages.
Final Office Action from U.S. Appl. No. 15/281,944, dated May 10, 2017, 42 pages.
Final Office Action from U.S. Appl. No. 15/282,082, dated Apr. 24, 2017, 38 pages.
First Office Action and Search Report from foreign counterpart China Patent Application No. 201380059899.8, dated Sep. 1, 2017, 10 pages.
First Office Action and Search Report from foreign counterpart Chinese Patent Application No. 201380059921.9, dated Sep. 20, 2017, 10 pages. (Translation available only for office action).
First Office Action and Search Report from foreign counterpart Chinese Patent Application No. 201611088838.6, dated Apr. 28, 2018, 24 pages.
First Office Action and Search Report from foreign counterpart Chinese Patent Application No. CN201380062688.X, dated Sep. 30, 2017, 10 pages.
First Office Action and Search Report from foreign counterpart Chinese Patent Application No. CN201380060918.9, dated Dec. 5, 2017, 30 pages.
Grant of Patent from foreign counterpart Korean Patent Application No. 10-2016-7029366, dated Jul. 31, 2017, 4 pages.
Gschwind M., "Optimizing Data Sharing and Address Translation for the Cell Be Heterogeneous Chip Multiprocessor," IEEE, 2008, pp. 478-485.
IBM Technical Disclosure Bulletin NN84102905, "Multiprocessor System to Improve Context Switching," Oct. 1, 1984, 4 pages.
Intel, "Intel 915G/915GV/91 OGL Express Chipset Graphics and Memory Controller Hub (GMCH)," White Paper, Sep. 2004, 9 pages.
International Preliminary Report on Patentability for Application No. PCT/US2013/046166 dated Jul. 9, 2015, 6 pages.
International Preliminary Report on Patentability for Application No. PCT/US2013/047387, dated Jul. 9, 2015, 6 pages.
International Preliminary Report on Patentability for Application No. PCT/US2013/048339, dated Jul. 9, 2015, 7 pages.
International Preliminary Report on Patentability for Application No. PCT/US2013/048694, dated Jul. 9, 2015, 6 pages.
International Preliminary Report on Patentability for International Application No. PCT/US2013/046863, dated Jul. 9, 2015, 6 pages.
International Preliminary Report on Patentability for International Application No. PCT/US2013/046911 dated Jul. 9, 2015, 7 pages.
International Search Report and Written Opinion for Application No. PCT/US2013/046166 dated Sep. 2, 2013, 9 pages.
International Search Report and Written Opinion for Application No. PCT/US2013/046863, dated Aug. 28, 2013, 9 pages.
International Search Report and Written Opinion for Application No. PCT/US2013/046911 dated Sep. 27, 2013, 10 pages.
International Search Report and Written Opinion for Application No. PCT/US2013/047387, dated Sep. 2, 2013, 9 pages.
International Search Report and Written Opinion for Application No. PCT/US2013/048339 dated Nov. 1, 2013, 10 pages.
International Search Report and Written Opinion for Application No. PCT/US2013/048694, dated Sep. 30, 2013, 9 pages.
Jesshope C., et al., "Making Multi-cores Mainstream—from Security to Scalability," Parallel computing: From multicores and GPU's to petascale, 2010, 16 pages.
Lankamp M., "Developing a Reference Implementation for a Microgrid of Microthreaded Microprocessors," Diss. Master's thesis, University of Amsterdam, Amsterdam, the Netherlands, 2007, 57 pages.
Li E., et al., "Accelerating Video-Mining Applications Using Many Small, General-Purpose Cores," IEEE, 2008, 2 pages.
Li T., et al., "Operating system support for overlapping-ISA heterogeneous multi-core architectures," HPCA-16 2010 The Sixteenth International Symposium on High-Performance Computer Architecture. IEEE, 2010, 12 pages.
Lyons M., et al., "PowerPC storage model and AiIX programming," Nov. 16, 2005, 15 pages.
Macieira T, "Architectures and ABIs detailed," Thiago Madeira's blog, Jan. 10, 2012, 15 pages.
Navada S.S., "A Unified View of Core Selection and Application Steering in Heterogeneous Chip Multiprocessors", Abstract, Chapters 1, 3, and 6 Jun. 15, 2012, 114 pgs.
Non-Final Office Action from U.S. Appl. No. 13/729,915, dated Jul. 23, 2015, 22 pages.
Office Action from foreign counterpart Korean Patent Application No. 1020167029367, dated Oct. 27, 2016, 6 pages.
Poss R., et al., "Apple-Core: Microgrids of SVP Cores Flexible, General-purpose, Fine-grained Hardware Concurrency Management," IEEE, Sep. 5, 2012, 8 pages.
Request for Amendment from foreign counterpart Korean Patent Application No. KR1020157012861, dated May 27, 2015, 5 pages.
Second Office Action from foreign counterpart Chinese Patent Application No. CN201380060918.9, dated Jul. 3, 2018, 8 pages.
Second Office Action from foreign counterpart Chinese Patent Application No. CN201380062688.X, dated Mar. 21, 2018, 3 pages.
Second Office Action from foreign counterpart Chinese Patent Application No. 201380059888, dated Oct. 16, 2017, 15 pages.
Second Office Action from foreign counterpart Chinese Patent Application No. 201380059921.9, dated Mar. 20, 2018, 7 pages.
Sykora J., et al., "Microthreading as a Novel Method for Close Coupling of Custom Hardware Accelerators to SVP Processors," 14th Euromicro Conference on Digital System Design, Architectures, Methods and Tools, DSD 2011, Aug. 2011, 8 pages.
Taylor I.L., "64-bit PowerPC ELF Application Binary Interface Supplement 1.9", Chapters 1 and 3-3.2.5, 2004, 62 pages.
Third Office Action from foreign counterpart Chinese Patent Application No. 201380059888.0, dated Jul. 3, 2018, 17 pages.

(56) References Cited

OTHER PUBLICATIONS

Vo H., "Hardware Support for Irregular Control Flow in Vector Processor," May 7, 2012, 10 pages.
Vuletic M., "Unifying Software and Hardware of Multithreaded Reconfigurable Applications within Operating System Processes," 2006, 160 pages.

* cited by examiner

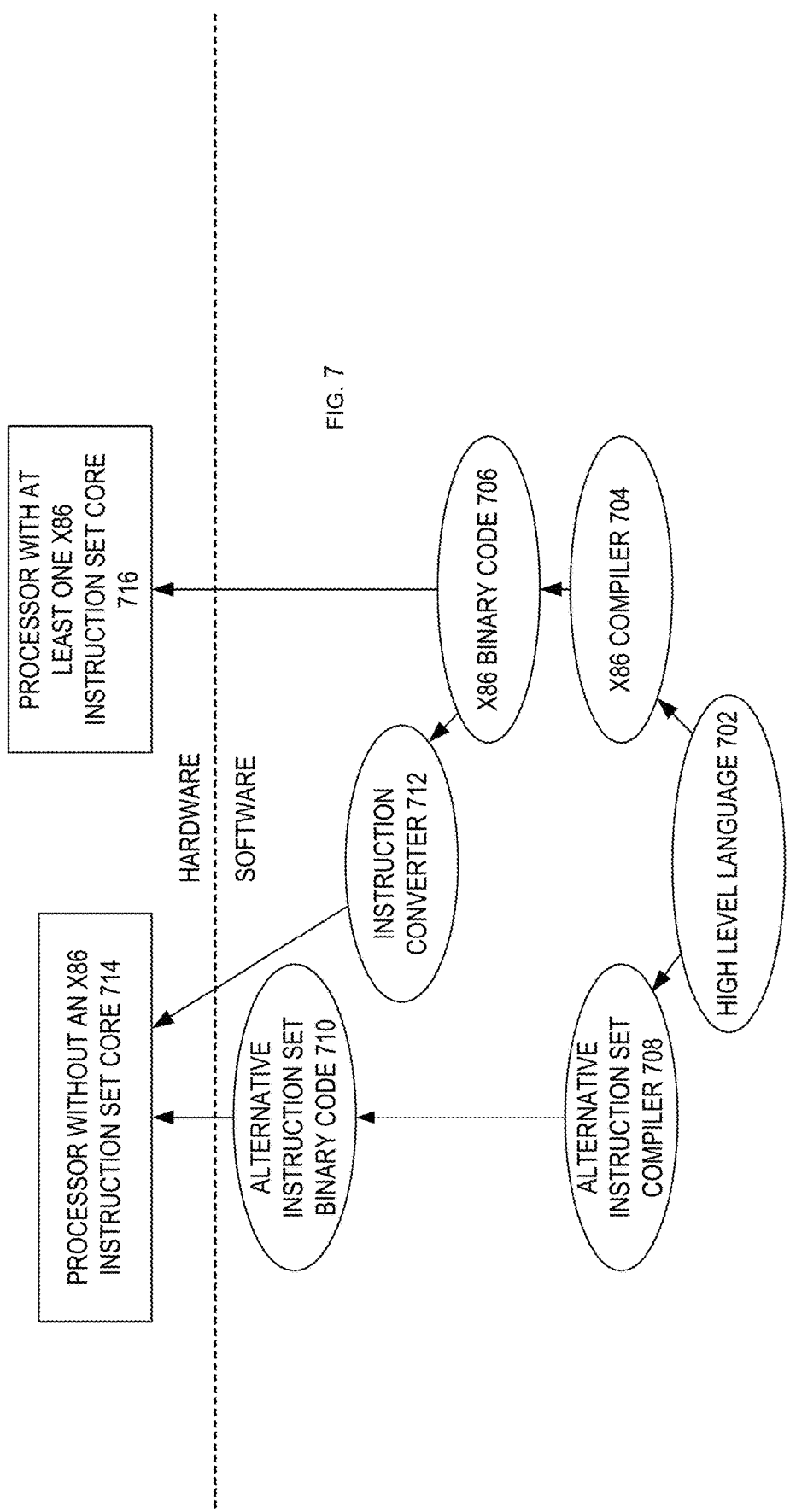

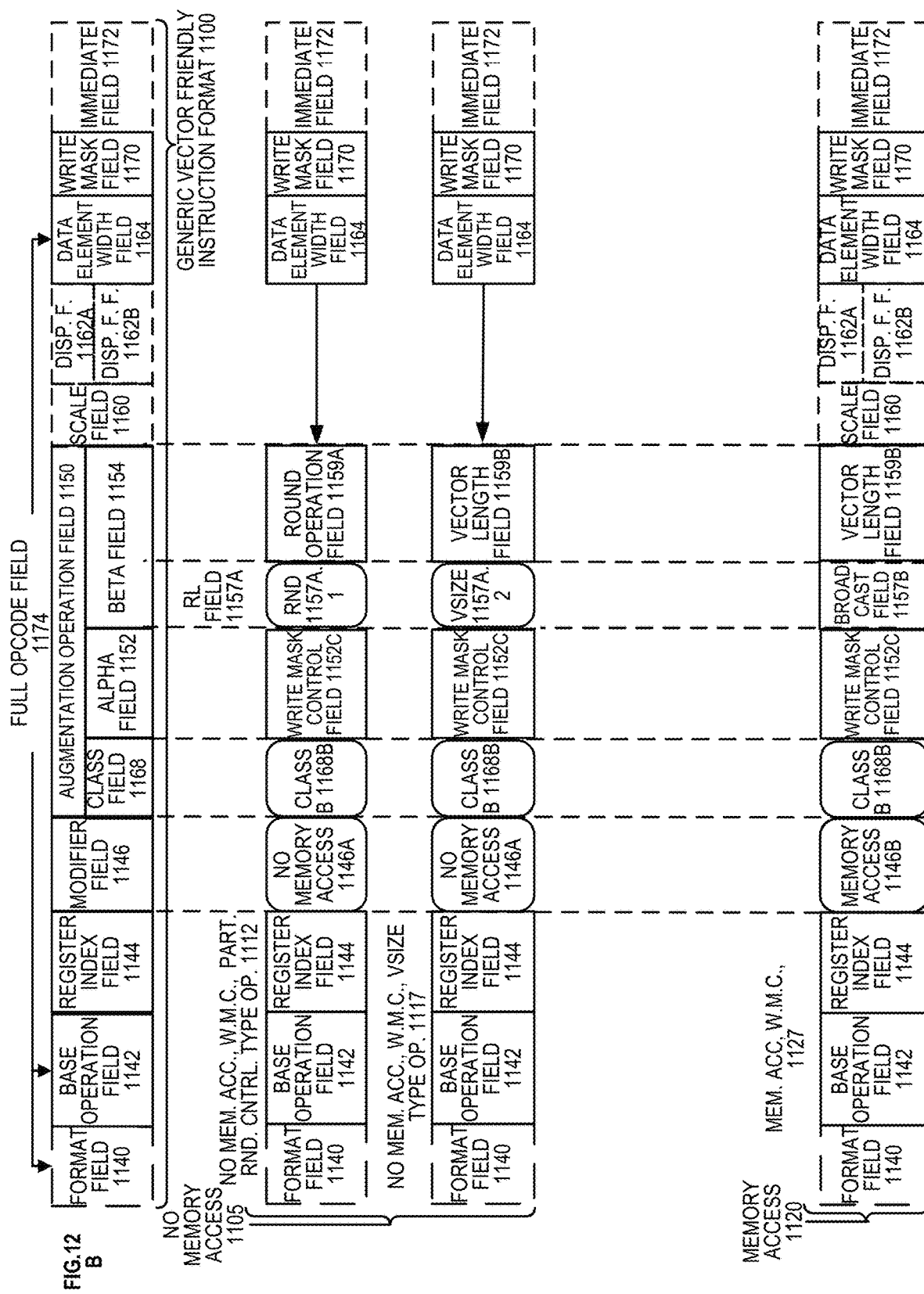

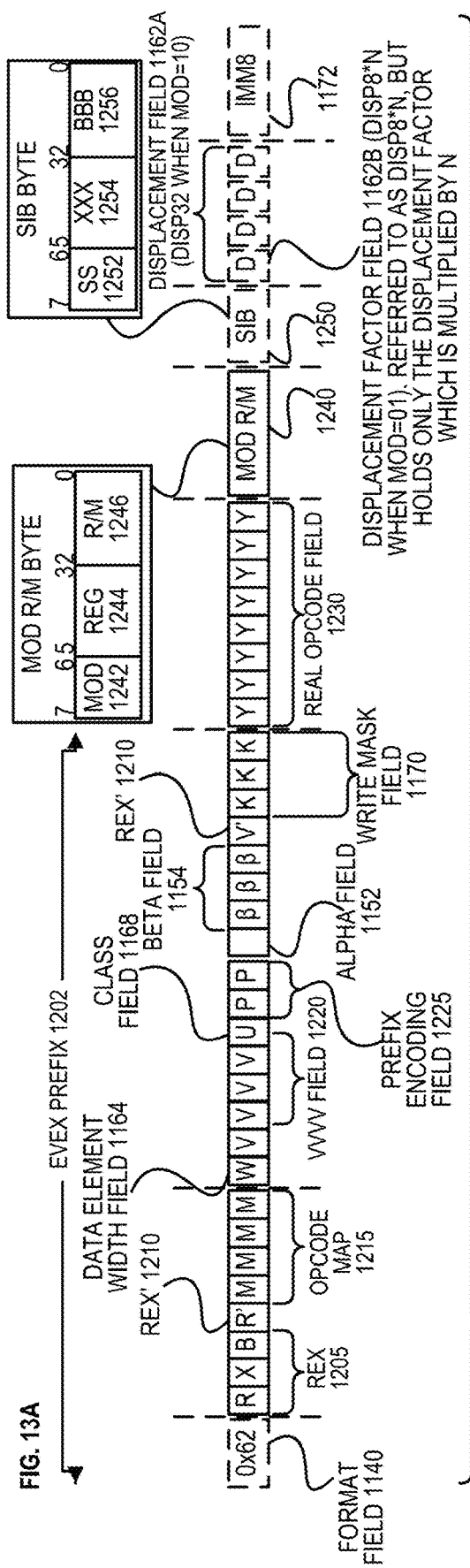
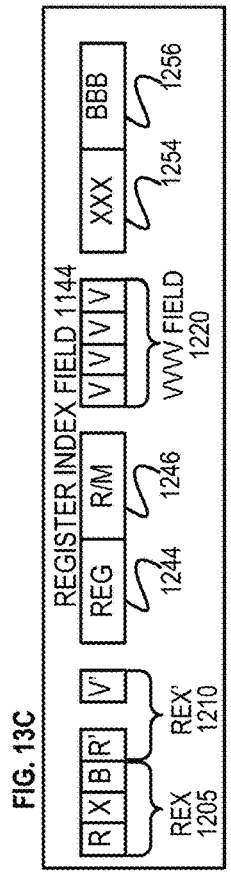
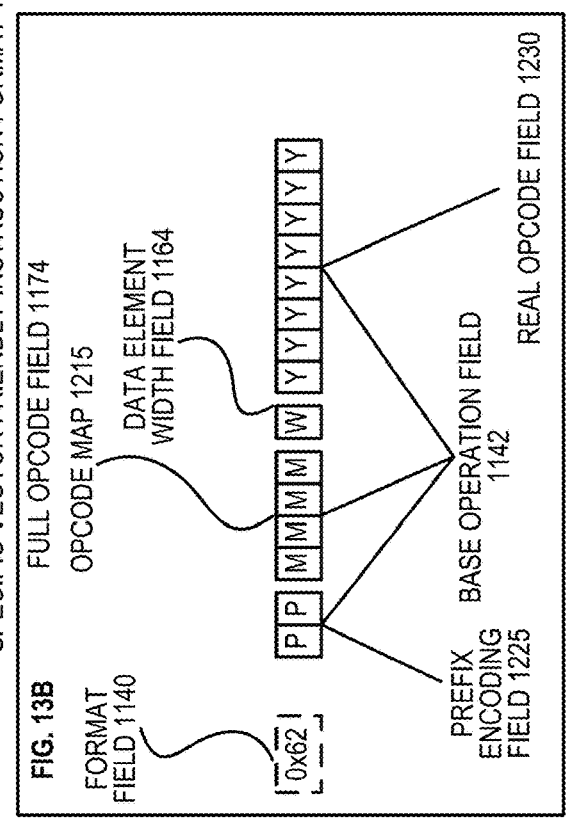
FIG. 13A
FIG. 13B
FIG. 13C

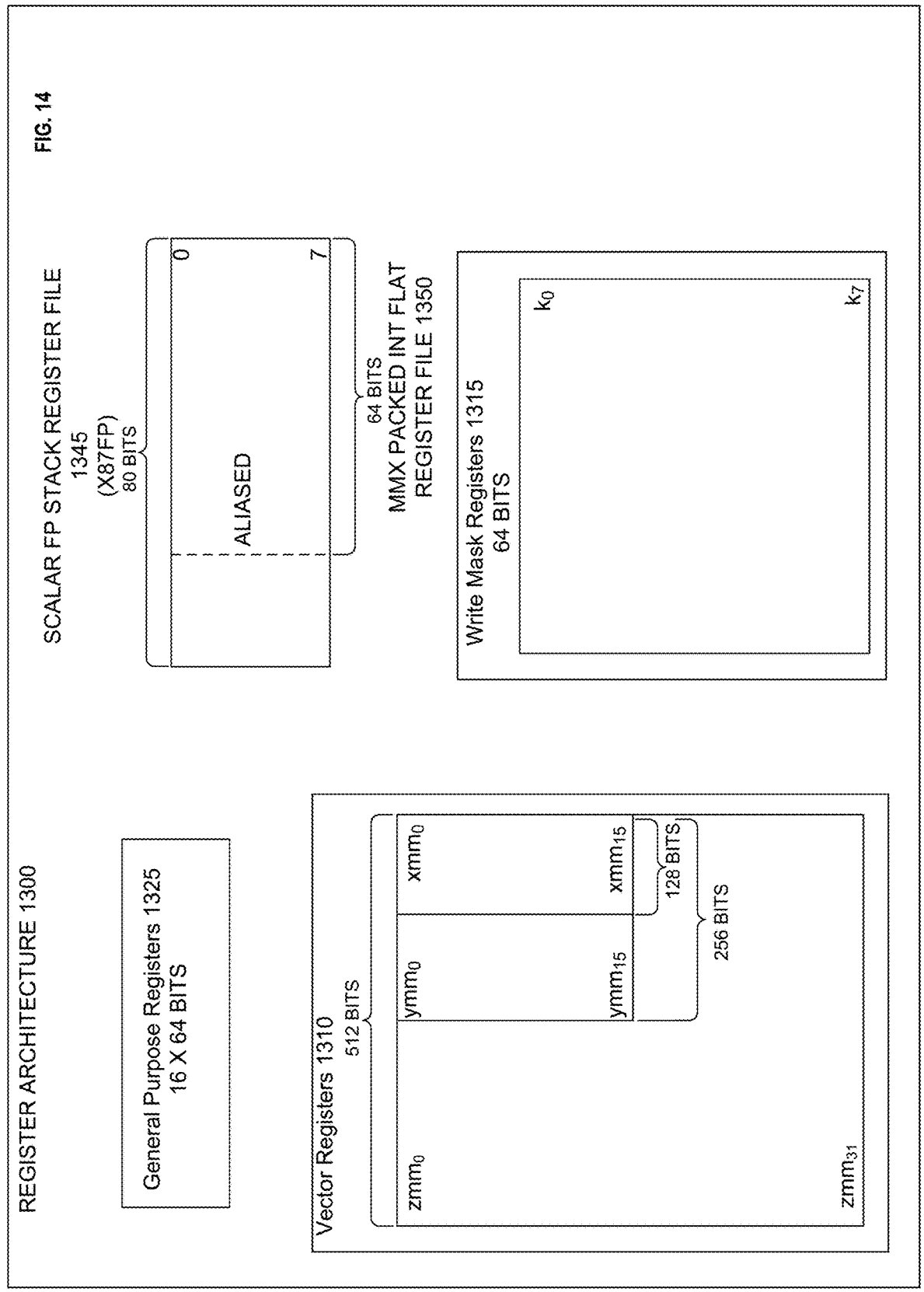

APPARATUS AND METHOD FOR A HYBRID LATENCY-THROUGHPUT PROCESSOR

BACKGROUND

Field of the Invention

This invention relates generally to the field of computer processors. More particularly, the invention relates to an apparatus and method for a hybrid latency-throughput processor.

Description of the Related Art

Invoking accelerators today requires going through a driver interface. In a system in which a hierarchical protection domain is used, this means switching to ring 0 and copying data to a different address space, which consumes significant time and processing resources. Due to the high latency, such accelerator interfaces are also inherently asynchronous. Programmable accelerators require the accelerated code to be implemented in their own instruction set architecture (ISA).

Some current processor architectures attempt to address some of these concerns but provide only a coarse-grained asynchronous mechanism with a high latency between the accelerated task request and its execution. In addition, current architectures use a non-X86 ISA, which requires a separate toolchain to generate and integrate the accelerated task with the main x86 program.

In addition, current asynchronous hardware accelerators (e.g., GPUs) allow the accelerated task to execute unrelated to the application thread that triggered it. This allows the application thread to handle exceptions and/or interrupts without affecting the accelerated task, and even allow the application thread to migrate between cores without impacting the accelerated task location on the system.

Current synchronous hardware accelerators need to ensure that interrupts, exceptions, context switches and core migrations are still functionally correct and ensure forward progress. This is done either by (1) ensuring the accelerator is short enough and doesn't cause any exceptions, so that any interrupts are deferred until the accelerator is done; (2) maintaining the accelerator's forward progress in existing architectural registers (e.g., REPMOV); or (3) defining new architectural registers to hold the accelerator status, and adding them to XSAVE/XRESTORE.

In addition, throughput program code is currently developed in specialized programming languages and instruction set architectures (ISAs) (e.g., for DSPs and GPUs). As such, throughout programs must be written in a different ISA and tool-chain than latency programs. A single application which has both latency and throughput parts must be split into separate sub-programs. Once separated, each sub-program runs on different hardware, incurring significant overhead in control and data transfer between the two sub-programs. Scheduling of the separate sub-programs over the different hardware resources is done separately by different entities such as the operating system and driver or middleware.

BRIEF DESCRIPTION OF THE DRAWINGS

A better understanding of the present invention can be obtained from the following detailed description in conjunction with the following drawings, in which:

FIG. 7 illustrates a block diagram contrasting the use of a software instruction converter to convert binary instructions in a source instruction set to binary instructions in a target instruction set according to embodiments of the invention;

FIGS. 12A and 12B are block diagrams illustrating a generic vector friendly instruction format and instruction templates thereof according to embodiments of the invention;

FIGS. 13A-D is a block diagram illustrating an exemplary specific vector friendly instruction format according to embodiments of the invention; and FIG. 14 is a block diagram of a register architecture according to one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
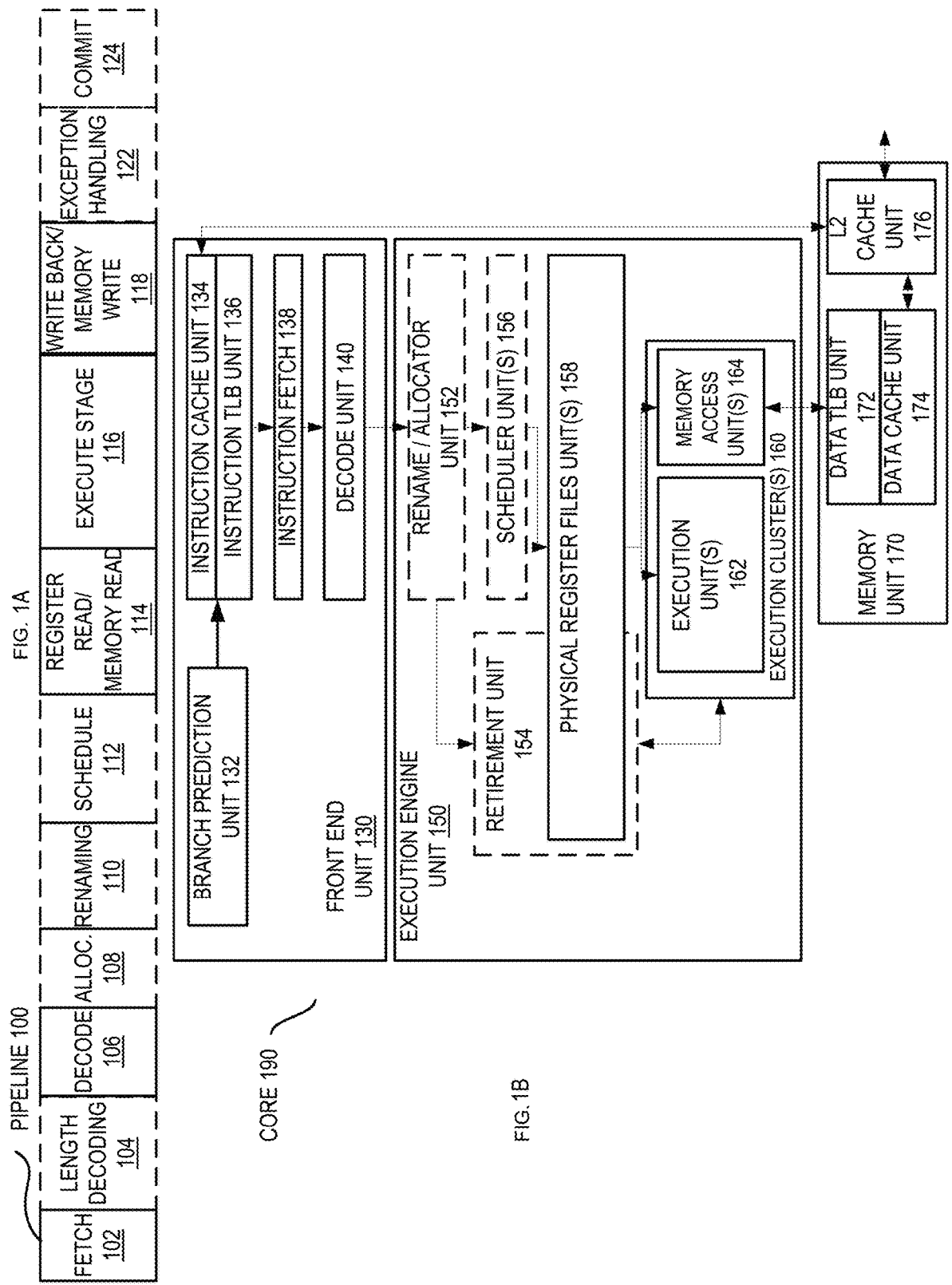
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
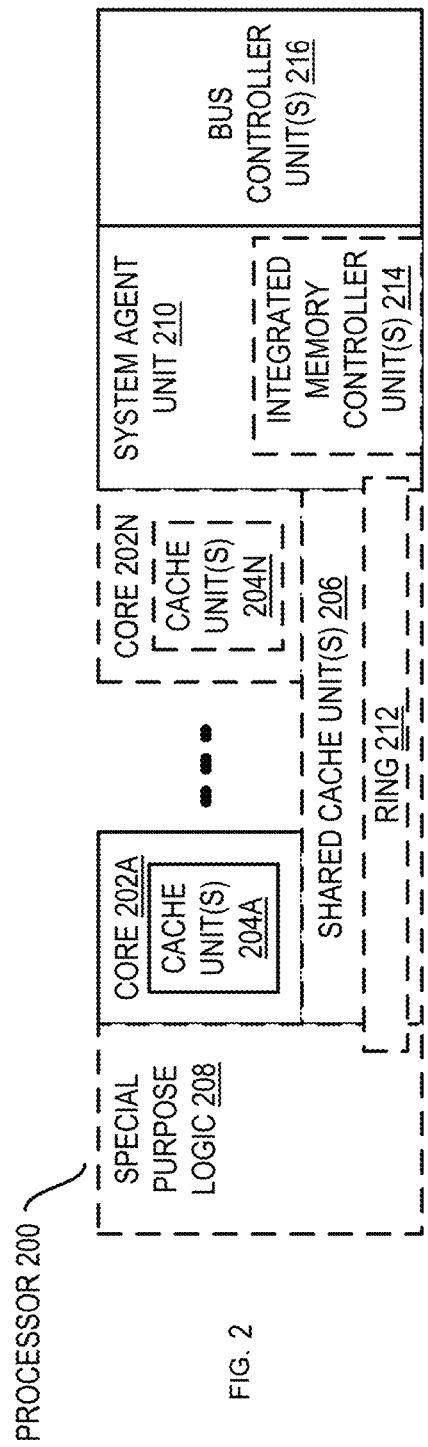
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A including cache unit(s) 204A, a system agent 210, a set of one or more bus controller units 216, while the optional addition of the dashed lined boxes illustrates an alternative processor 200 with multiple cores 202A-N each including a respective cache unit(s) 204A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
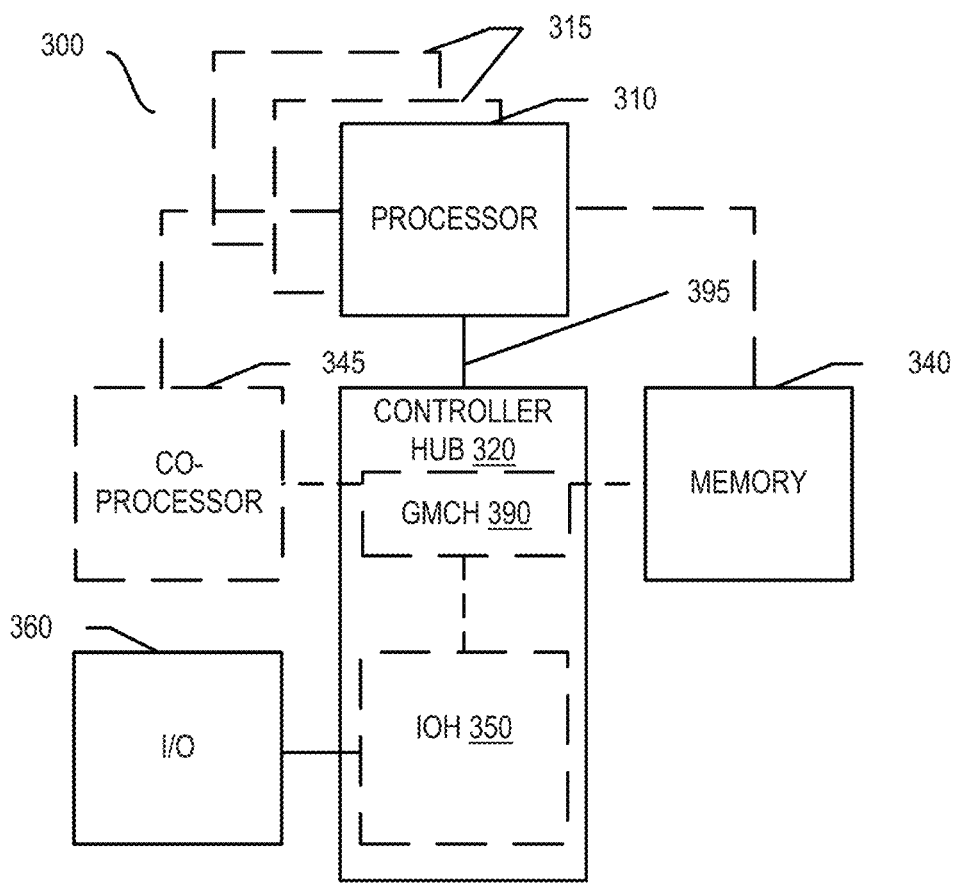
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
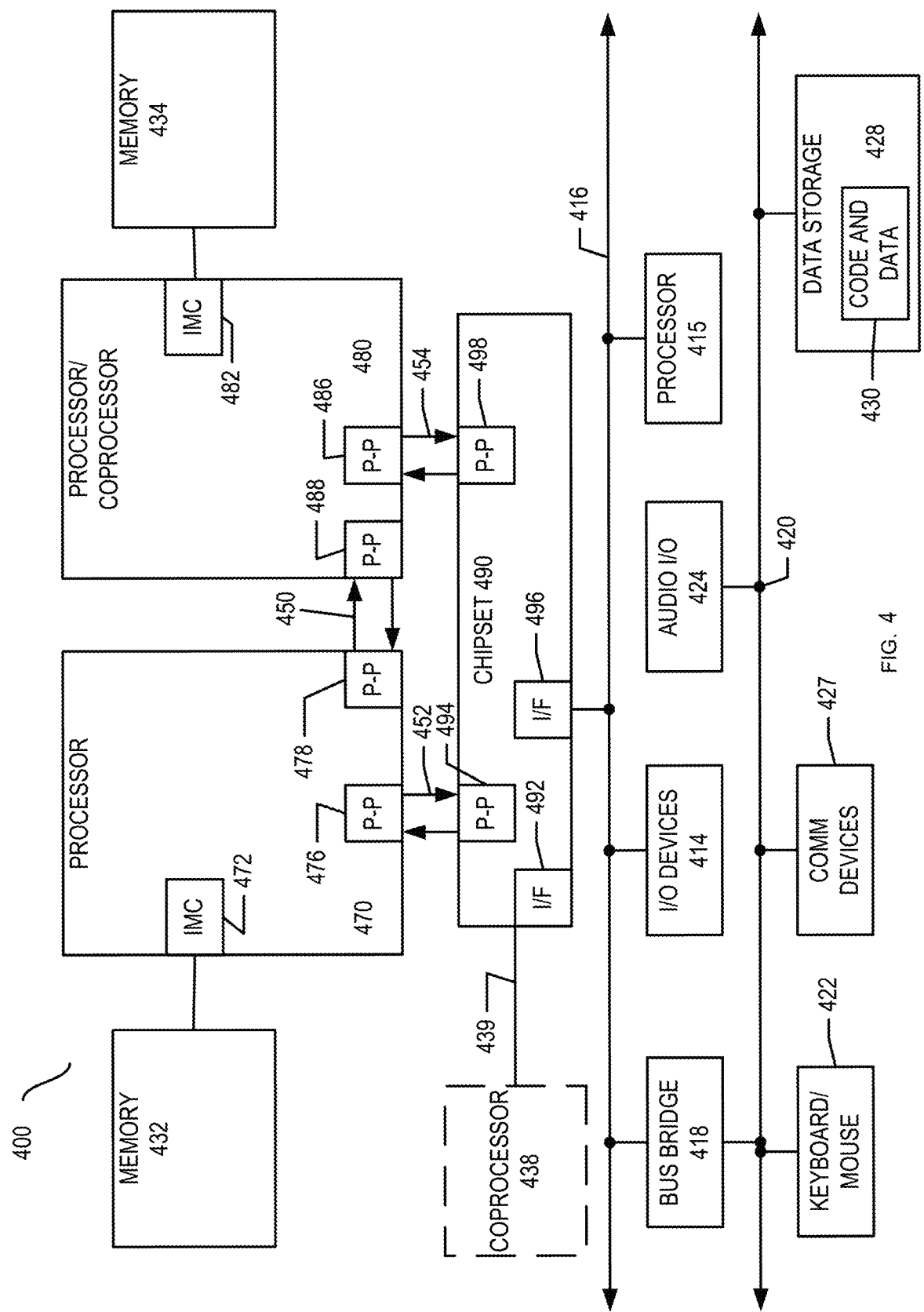
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439 via interface circuit 492. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
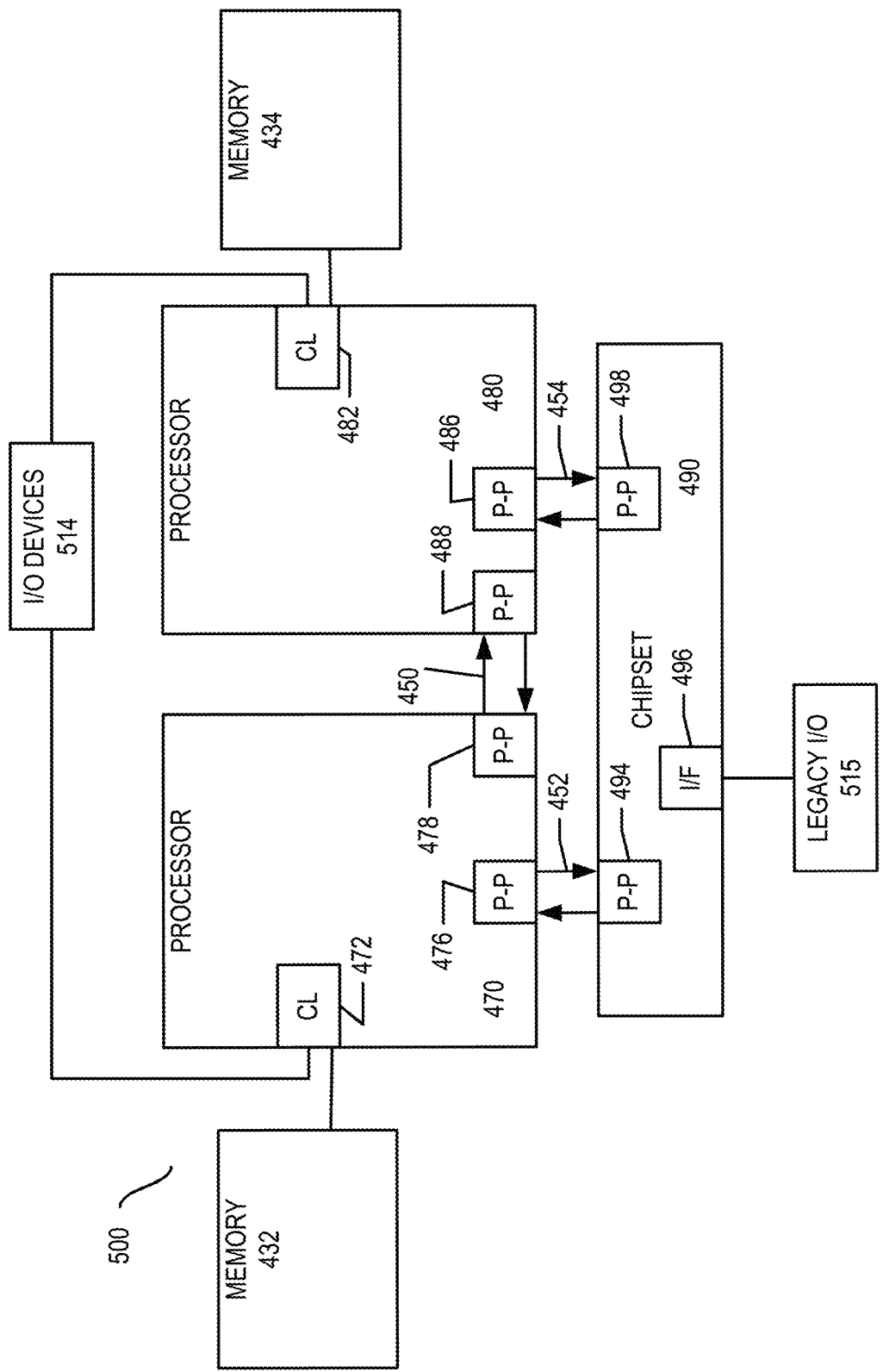
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
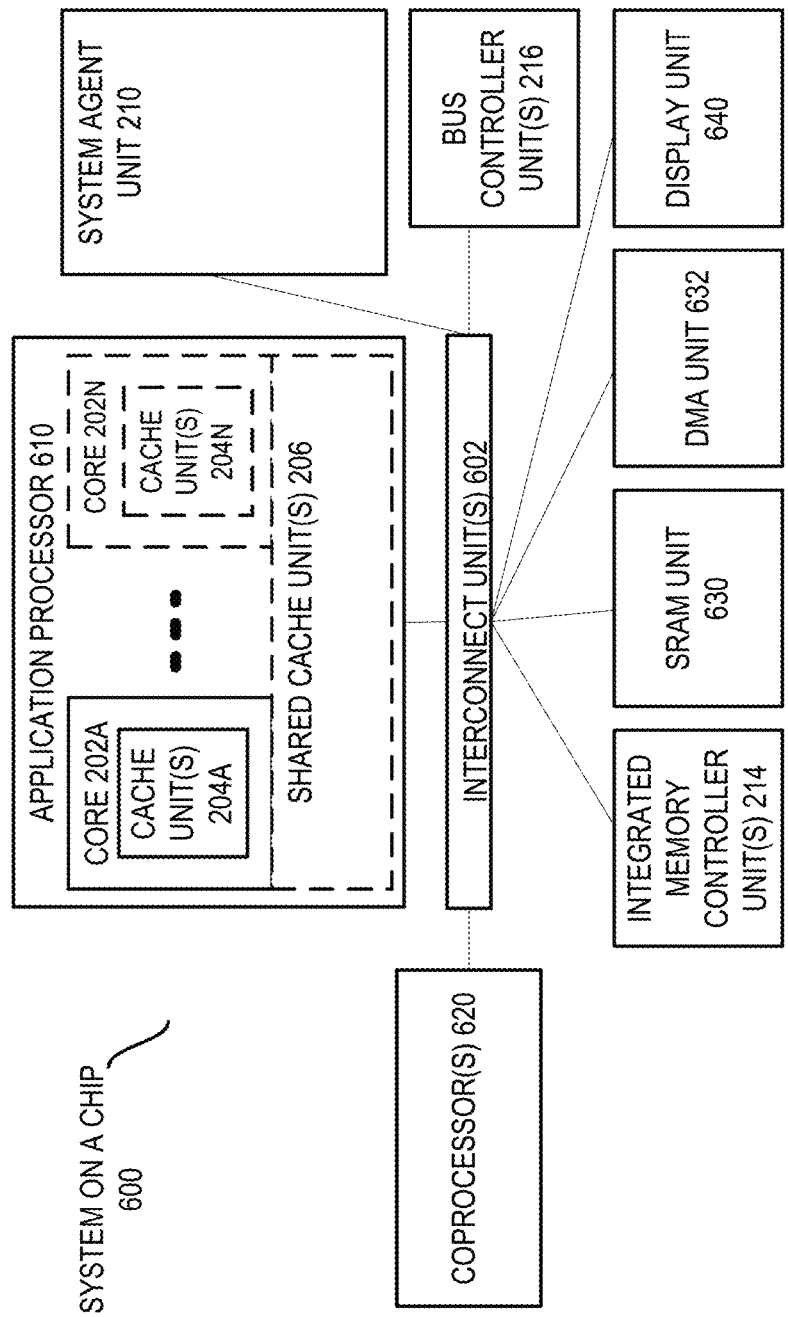
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Efficiently Invoking Accelerators

One embodiment of the invention provides a generic, extensible instruction for low-latency invocation of synchronous (e.g., fixed function or programmable) accelerators (e.g., co-processors, functional units), referred to herein as an "XCALL" instruction. In one embodiment, the instruction is an x86 instruction. However, the underlying principles of the invention are not limited to any instruction set architecture (ISA).

The instruction format according to one embodiment is: XCALL result-register, command-register, param-register which identifies a result register for storing results following executing of the instruction, a command register for storing the specific command and associated information to be executed by an accelerator in response to the instruction, and a parameter register for storing parameters associated with the invoked instruction, respectively. The specific information stored in each register according to one embodiment of the invention is set forth below.

Figure 8A:
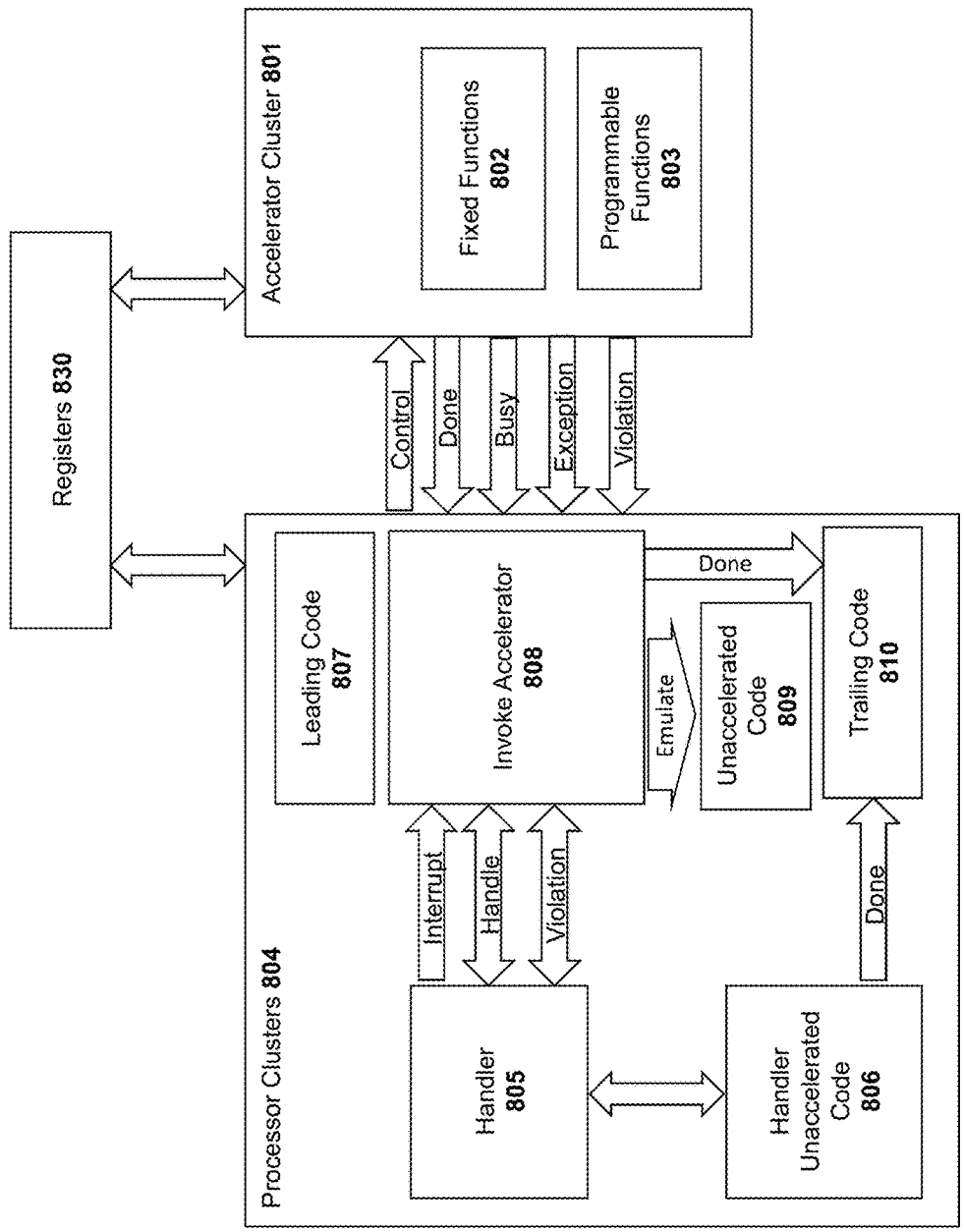
FIG. 8A illustrates a processor architecture in which embodiments of the invention may be implemented.

FIG. 8A illustrates a high level flow in which one or more processor clusters 804 perform general purpose processing operations and one or more accelerator clusters 801 perform accelerator-specific operations. By way of example, the general purpose processor clusters 804 may include execution logic within a processor core for executing instructions (e.g., general purpose instructions such as x86 instruction) including instructions which invoke commands on the accelerator clusters 801. In one embodiment, the accelerators of the accelerator cluster 801 are co-processors or functional units for performing specialized data processing operations (e.g., vector/SIMD operations, graphics operations, sort and loop operations, etc). The underlying principles of the invention, however, are not limited to any particular type of general purpose cores or accelerator cores.

The processor clusters 804 and accelerator clusters 801 may be logical units within the same processor chip or core. Alternatively, the processor clusters 804 may be on one chip and the accelerator clusters 801 may be on a different chip (either in the same semiconductor package or on different packages) and connected via a communication bus (e.g., such as a PCI Express, Direct Media Interface (DMS) or other type of communication bus). In yet another embodiment, some of the accelerator clusters 801 may be on the same chip or core as the processor clusters 804, while other accelerator clusters 801 may be on a different chip or core. The embodiments of the invention described herein are not limited to any particular chip/packaging configuration and support implementations with multiple different types of accelerator clusters.

As illustrated in FIG. 8A, a set of registers 830 are provided to enable communication of commands, parameters and results between the general purpose processor clusters 804 and the accelerator clusters 801 as described herein. Specifically, in one embodiment, the register set 830 includes the command registers, result registers, and parameter registers specified by the XCALL instruction. The register set 830 may be general purpose registers (GPRs) which are used for the purposes specified below (e.g., storing commands, parameter data, and result data in response to the execution of an XCALL instruction). In an alternate embodiment, these are dedicated, application-specific registers.

In one embodiment, the clusters execute program code 806-807, 809-810, including an XCALL instruction which may cause one or more accelerators to be invoked 808. In response, control information specifying an operation to be performed is provided to the accelerator 801 via a command register (described below with respect to FIG. 8B) and/or parameter register within the register set 830. In response, the accelerator may use one or more fixed function units 802 and/or programmable function units 803 to execute the command. Alternatively, the accelerator cluster 801 may respond with a busy indication, exception, or violation. The results are then provided to the processor clusters 804 via a result register within the register set 830 (described below with respect to FIG. 8C). If the command was successfully executed, the resulting data may be stored in the result register. By contrast, if the command was not successfully executed, then data indicating the reason for the failure may stored in the result register (and used, for example, to determine whether to re-attempt to execute the command).

As indicated in FIG. 8A, one or more handlers 805 may be executed on the processor clusters. In one embodiment, interrupts generated by the handler may cause an invocation of the accelerator clusters, as illustrated.

Figure 8B:
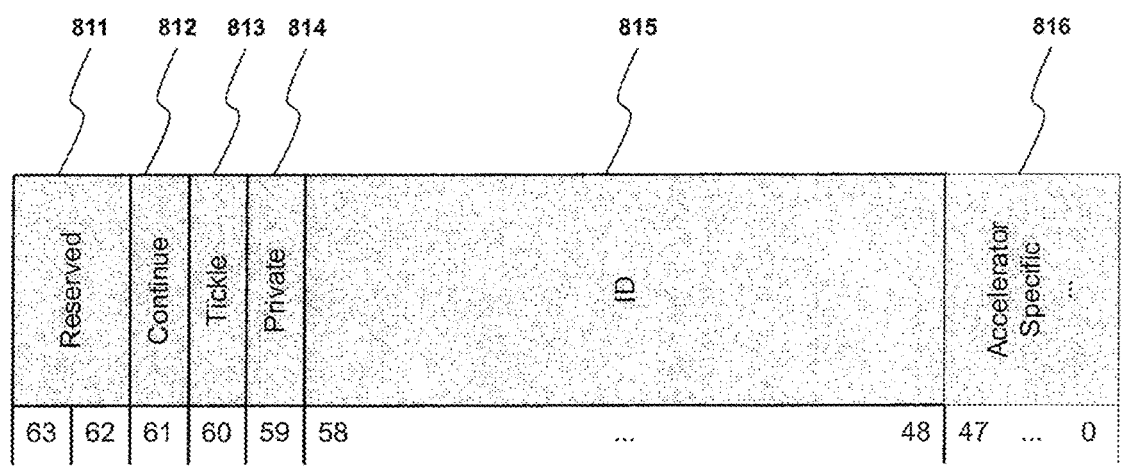
FIGS. 8B-C illustrate registers for storing data used to invoke accelerators and review results.

FIG. 8B illustrates one embodiment of a command register structure. As illustrated, the top 16 bits of the command register (identified as fields 811-815) contain the following data fields encoded with the specified number of bits:
Reserved 811: 2 bit
Continue 812: 1 bit
Tickle 813: 1 bit
Private 814: 1 bit
Id 815: 11 bits In one embodiment, the id uniquely identifies the accelerator to invoke. For example, as mentioned above, multiple accelerators may be included within the accelerator cluster 801 and each of these accelerators may be uniquely identified by an accelerator id code.

In one embodiment, the "private" bit indicates whether the accelerator belongs to a particular group of known accelerators. For example, if the private bit is set to 0, the id may identify one of a universal set of accelerators (as defined by the assignee of the present patent application) such that the same id refers to the same accelerator across all computer systems/processors. If the private bit is set to 1, the id identifies a proprietary or stock-keeping unit (SKU)-specific accelerator. Thus, with the private bit set to 1, the same id may refer to different accelerators in different systems.

In one embodiment, the low 48 bits of the command register (identified as field 816 in FIG. 8B), and all of the parameter register (not shown), contain application-specific data defined by the specific invoked accelerator.

In one embodiment, when retired, the XCALL instruction sets the Z-bit in EFLAGS as follows. As is understood by those of skill in the art, EFLAGS is a status register in an x86 implementations which contains the current state of the processor. The Z bit is set to 1 if the XCALL completed the execution of the requested accelerator. In this case, if the tickle bit was set to 1, the result register is not modified, and no actual work is done. If the tickle bit was set to 0, the result register is set to an accelerator-specific value. The Z bit is set to 0 if the XCALL did not do any work. While the Z-bit is used to indicate whether the XCALL instruction was successful in this embodiment, a different bit may be set while still complying with the underlying principles of the invention.

Figure 8C:
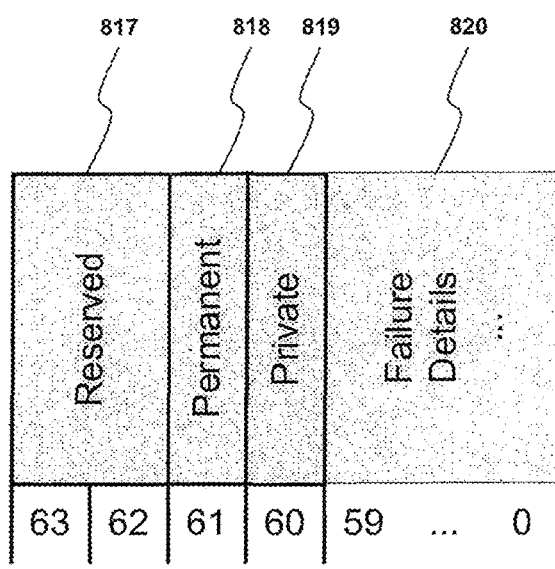

In one embodiment, illustrated in FIG. 8C, the result register contains the following data fields:
Reserved 817: 2 bits (always set to zero in one embodiment)
Permanent 818: 1 bit
Private 819: 1 bit
Failure Details 820: 60 bits In one embodiment, the permanent bit 818 is used to indicate whether a subsequent call to the same XCALL will succeed. For example, the permanent bit being set to 0 indicates that a future call of the same XCALL may succeed (e.g., if the accelerator was busy serving another HW thread). By contrast, if there is no point in re-trying the same XCALL (e.g., if the specified accelerator does not exist in the current SKU, or if the specific command and/or parameter combination requested is not supported by the accelerator in this SKU) then the permanent bit is set to 1.

In one embodiment, the low 60 bits of the result register are set to provide additional data on the reason for the XCALL failure. In one embodiment, the accelerator cluster 801 provides the information needed to update the result register as described above.

Figure 9A:
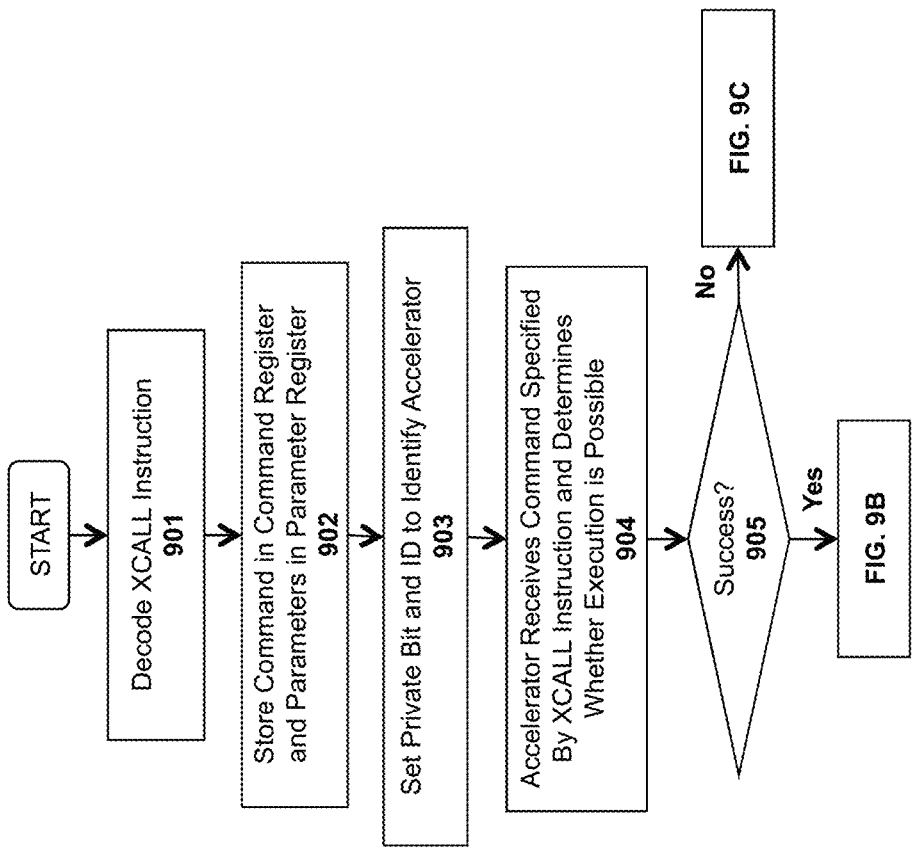
FIGS. 9A-C illustrate method for invoking an accelerator in accordance with one embodiment of the invention.
Figure 9B:
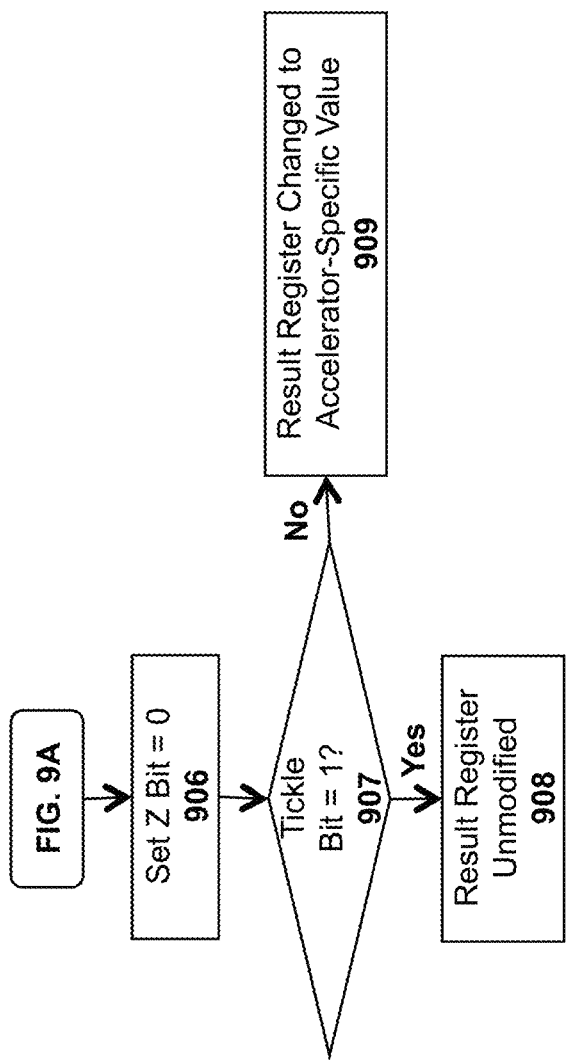
Figure 9C:
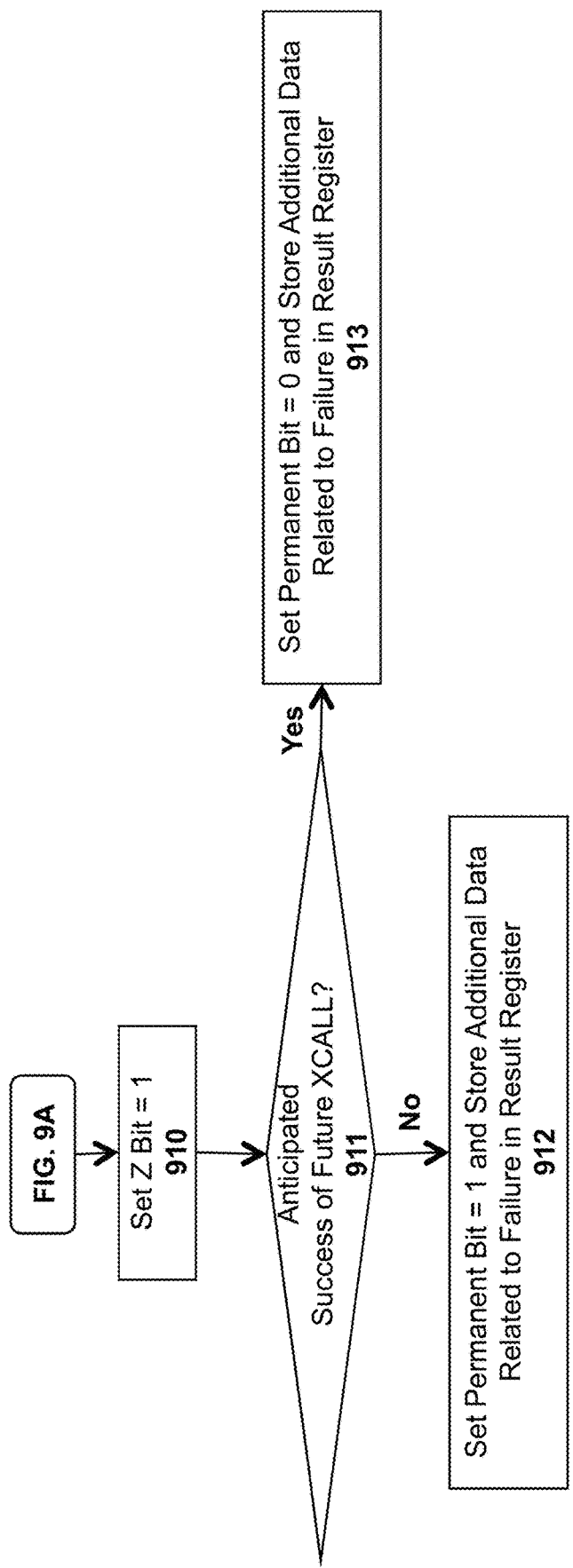

In one embodiment, if the private bit of the result register 819 is set to 1, these details have an accelerator-specific format. If the private bit is set to 0, these details are provided in a predetermined, universal format (e.g., such as a format specified by the assignee of the present patent application). Exemplary failure result codes employed in one embodiment of the invention include:
Reserved bits in command register were not 0
Accelerator does not exist
Accelerator is busy serving another thread The flowchart set forth in FIGS. 9A-C illustrates the operations performed by one embodiment of the invention. At 901, an XCALL instruction is decoded. As a result, at 902, data related to the command to be executed by an accelerator is sent to the command register and any necessary parameters are sent to the parameter register. At 903, the private bit is set in the command register depending on whether the accelerator belongs to a known group of accelerators or a proprietary accelerator (as described above). In addition, at 903, an ID code is updated in the command register to identify the specific accelerator which will execute the command.

At 904, the identified accelerator receives the command specified by the XCALL instruction and determines whether it can be executed. For example, the accelerator may currently be busy servicing another hardware thread and so may be unable to execute the current command. Additionally, if the current command and/or parameter combination requested is not supported by the accelerator, then the accelerator will not be able to successfully execute the command. Alternatively, the accelerator may successfully execute the command at 904.

If the command is successfully executed, then the process moves to FIG. 9B where, at 906, the EFLAGS Z-bit is set equal to 0 to indicate successful execution of the command (as discussed above). If the tickle bit of the command register was previously set to 1 (e.g., at operation 902 in FIG. 9A), determined at 907, then at 908, the result register is left unmodified. If the tickle bit was previously set to 0, then at 909, the tickle bit is set to an accelerator-specific value.

If the command specified by the XCALL instruction was not successfully executed by the accelerator (determined at 905 in FIG. 9A), then at 910 in FIG. 9C, the Z bit of EFLAGS is set equal to 1 (to indicate the failure to execute the command). If it is anticipated that a future attempt to execute the XCALL instruction will be successful, determined at 911, then at 913, the permanent bit of the result register (818 in FIG. 8C) is set to 0. Additional data specifying the reason for the failure may also be set in the failure details field 820 of the result register.

If at 911 it is anticipated that a future attempt to execute the XCALL instruction will be unsuccessful, then at 912 the permanent bit is set equal to 1 (to indicate the permanence of the result) and additional data related to the failure to execute the XCALL instruction is set in the details field 820 of the result register. In either case above, the data in the details field 820 may be analyzed to determine the root cause of the failure and/or to take steps to modify the instruction execution.

As mentioned above, the control register and/or the parameter register may be modified by the XCALL instruction. In addition, just like a normal call, an XCALL may consume stack area within the processor. In one embodiment which uses an x86 architecture, during the XCALL (e.g., when examined by an exception handler), the 64-bit stack pointer register (RSP) is be updated to reflect the stack usage. On retirement, the RSP register is restored to its original value to reflect releasing the used stack area. The amount of stack used depends on the specific accelerator in use.

The invoked accelerator may examine and/or modify the value of additional registers and/or memory locations during the sequences of operations described herein. While the specific semantics may be different for different accelerators, the underlying principles of the invention remain the same.

In one embodiment, accelerators are configured to obey the following set of rules:

(1) If interrupts and/or exceptions are allowed during the XCALL, then the continue bit is set to 1 and the XCALL is re-issued once the handler completes and execution continues.

(2) The accelerator must ensure forward progress in the presence of interrupts and/or exceptions.

(3) Any state required by the accelerator to implement forward progress in the presence of interrupts and/or exceptions may be updated in documented accelerator-specific location(s), which can be in one or more of (a) the command and/or parameter registers; (b) other architectural registers; (c) the stack area; (d) additional memory locations. In all of the above cases, such a state must survive save and restore operations such as from a context switch (e.g., XSAVE/context-switch/XRESTORE).

(4) An accelerator may choose to permanently reject an invocation if it is given an "invalid" command and/or parameter registers (e.g., unsupported features, values that exceed hardware limitations, . . . etc.). However, if an accelerator has accepted an invocation, it is responsible for completing the request and providing results.

(5) Programmable accelerators invoke user code, which may be restricted in accelerator-specific ways (represented by programmable functions unit 803 in FIG. 8A). For example, a "sort" accelerator may invoke the comparison function, and a "loop" accelerator may invoke the loop body. If the user code does not obey the expected restrictions (e.g., it tries to enter ring 0 when a ring-based hierarchical protection domain is used), then the accelerator will trigger an exception (specifically, UD), after saving its state as usual.

(6) The exception handler may choose to (a) complete the partially-evaluated accelerator in non-accelerated software, based on the saved state; (b) emulate the unsupported instruction, and re-issue the XCALL (requiring tweaking the saved state so the unsupported operation is not re-tried); or (c) terminate the execution. Simply trying to re-issue the XCALL without any modifications will simply re-trigger the exception (as expected for UD).

The embodiments of the invention described herein provide a standard mechanism which may be incorporated into an instruction set architecture (ISA) such as an x86 ISA for invoking accelerators. In contrast to the techniques described in the background of the present patent application, the accelerator invocation techniques described herein allow for fine-grained, low-latency synchronous accelerators that naturally share as much (or as little) of the core's resources such as memory translation, registers, caches, etc. Programmable XCALL accelerators allow the user to accelerate normal x86 code (e.g. loops and sorting), which is an integral part of the main x86 program and does not require a separate toolchain.

In addition, current accelerator interfaces are designed for a specific accelerator, while the embodiments of the invention described herein are extensible, allowing the streamlined provision of specific accelerators for specific market segments, as well as "universal" accelerators across all market segments. Accelerator invocation can be done at low latencies and without data copying overheads, allowing the ecosystem of such accelerators to cover functionality that was impractical to provide previously. It also becomes possible to tailor SKUs with accelerators for specific markets (embedded systems, image processing, HPC server, etcs), maintaining the tight integration with existing ISAs such as x86.

The XCALL interface described herein also opens up the ability to extend CPUs to cover functionality that was not previously accessible without stepping outside of the CPU ISA and toolchain (the x86 ISA for processors designed by the assignee of the present patent application). For example, using the techniques described herein programmable accelerators 803 such as programmable loop accelerators (SKMD) and sort accelerators may be provided, as well as fixed-function accelerators 802 such as those which perform Fast-Fourier Transform (FFT), texture sampling, and various other functions.

Fast Failure Handling of Complex ISA Instructions

Currently, failing instructions don't have a way to provide additional details about the failure, except by way of dedicated flag bits and/or dedicated registers typically for use in exception handlers. The embodiments of the invention described below provide a new "fast failure" behavior for instructions. In this new behavior, an instruction may return a success/fail indication (e.g., inside a flags register such as EFLAGS or some other register). In addition, in one embodiment, the instruction writes additional failure details in a normal destination register upon detection of a failure. This allows the application code to test the instruction success/failure and respond to certain failure modes without wasting processing resources and time which would result from the invocation of an exception handler or switching to a low level domain on a system which employs hierarchical protection domains (e.g., ring 0).

The proposed new trade-off point for instruction failure handling is selected for a certain class of instructions which are both failure-prone and have complex failure modes, such as the XCALL instruction described above. However, it is not suitable for other classes of operations such as division by zero (DIV) which are not prone to failure, or for failure-prone operations such as locks that have a simple failure mode.

One embodiment of the invention classifies instructions into one of the following groups:

(1) Always succeed. For example, every instance of an instruction which adds the values in two registers is expected to succeed. In one embodiment of the invention, no failure handling is provided for instructions in this category.

(2) Expected to succeed most of the time. For example, an instruction which divides the values stored in two registers will normally succeed. It will only fail as the result of a divide by zero error. In one embodiment of the invention, this class of instructions will trigger an exception handler on failure. The exception handler can then examine dedicated registers such as x86 control registers (CR) containing additional failure information to determine the correct course of action (e.g., CR2 for page faults). The exception handler is separated from the normal application code, keeping the application code clean and uncontaminated by the failure-handling logic.

(3) Expected to fail "often" with a simple failure mode. In one embodiment, for these types of instructions, bit(s) in flags and/or destination register(s) are set to indicate failure, but no details are provided. One example is an instruction which attempts to set locks data. For these simple failure modes, the application code itself explicitly handles recovery (without requiring an exception handler).

(4) Expected to fail "often" with a complex failure mode. For this class of instructions, processing systems currently need to resort to an exception handler to access dedicated registers for examining the failure details. For instructions that fail "often" and have complex failure modes, the embodiments of the invention allows setting bit(s) in flags and/or destination register(s) to indicate failure, and also set additional bit(s) in destination register(s) to specify the details of the failure, allowing the application code to take the correct actions without resorting to an exception handler. This reduces the cost of failure to a minimum (at the cost of having to test the result of each instruction). It also allows the application to trivially tailor its failure-handling logic to the current context, as opposed to using a hard-to-change universal exception handler (at the cost of having to explicitly invoke this logic at any invocation point).

By way of example, this behavior is described above for the XCALL instruction. In the example provided in FIGS. 9A-C, the XCALL instruction specifies a command to be executed by a particular accelerator. In response, the accelerator may execute the command and provide the results in the result register (which, as discussed may be a general purpose register). Alternatively, the accelerator may fail to execute the command for a variety of reasons and update the result register with the reasons for the failure. For example, the accelerator may currently be busy servicing another hardware thread and so may be unable to execute the current command. In this case, the XCALL instruction may be successfully executed at a later time when the accelerator is no longer busy. As such, in response to the failure indication, the permanent bit 818 is set to 0 in the result register to indicate that a second attempt may be made to execute the XCALL instruction.

In contrast, if the current command and/or parameter combination requested is not supported by the accelerator, then the accelerator will never be able to successfully execute the command. As such, in response to the failure indication, the permanent bit 818 is set to 1 in the result register to indicate that a second attempt will not result in successful execution of the XCALL instruction.

Subsequent program code may then read the result register to determine how to proceed. For example, if the permanent bit is set to 0, it may again attempt to execute the XCALL instruction while if the permanent bit is set to 1, it may not attempt to execute the XCALL instruction.

Figure 10A:
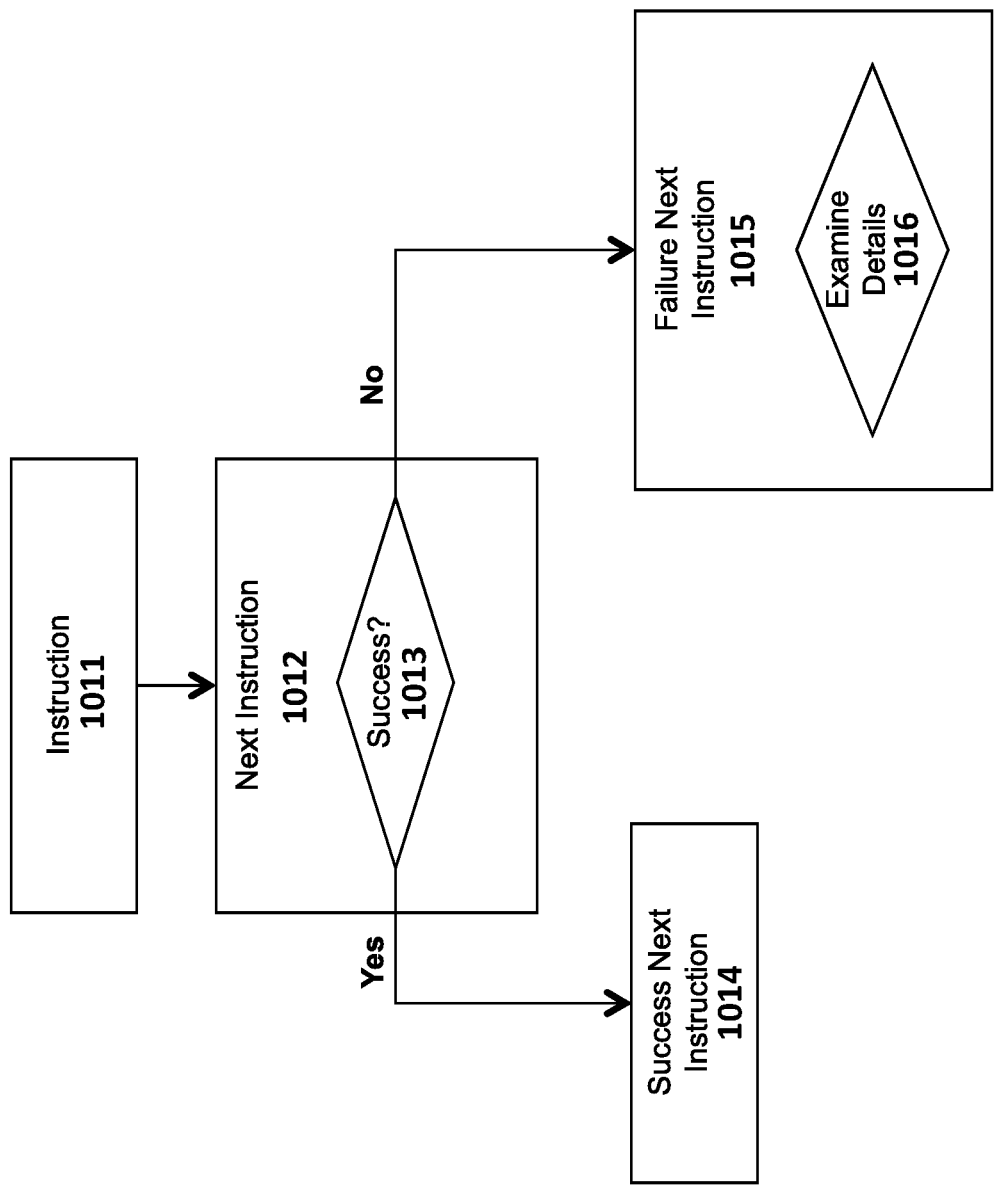
FIG. 10A illustrates a method for processing complex instructions which fail often.

FIG. 10A is a flowchart which illustrates one embodiment of the invention for implementing this mode of operation. The operations specified in the flowchart may be implemented by logic within an execution unit. At 1011, an attempt is made to execute a first instruction and, at 1012, an attempt is made to execute a second instruction. If the first instruction was successfully executed, determined at 1013, then at 1014, the second instruction is also successfully executed. For example, the second instruction may rely on the results of the first instruction written to a register (such as the result register mentioned above).

If the first instruction was not successfully executed then, at 1015, the second instruction also fails to execute. In contrast to prior implementations, the complex failure details are examined at 1016 without invoking an exception handler so that a failure evaluation can be performed by the application program code. In particular, a subsequent instruction may be executed to read the results from the result register and determine whether a new attempt should be made to execute the first instruction. If the results of the failure indicate that a second attempt would not work, then the second attempt may be prevented, saving time and processor resources. If the results indicate that a second attempt may be successful, then a second attempt to execute the first instruction may be made. While these specific examples are provided for ease of explanation, it should be noted that the underlying principles of the invention are not limited to these specific details.

Thus, in the embodiments of the invention described herein, an instruction's normal destination registers are used for a dual role; they hold the result in the case of normal execution, and failure details if the instruction fails. This is different from current implementations where there are dedicated registers for computation results and for failure results and/or where an exception handler must be invoked.

These techniques may be applied to all providers of programmable processors (CPUs, DSPs, GPUs, . . . ).

The use of fast failure handling of complex instructions opens up the possibility of implementing instructions such as XCALL which would otherwise be difficult to define as an efficient instruction. Processors using such efficient instructions will realize improved performance and reduced development costs.

Task Switchable Synchronous Hardware Accelerators

Synchronous hardware accelerators need to ensure forward progress in case of exceptions; for this they need to save their state in a location that survives save and restore operations (such as XSAVE/XRESTORE in x86 architectures). One embodiment of the invention enables this operation by extending the save/restore area in order to support new hardware accelerators (such as those described above and illustrated in FIG. 8A).

One embodiment of the invention uses the stack area in memory for storing the intermediate state of synchronous hardware accelerators to allow for a robust exception model, including handling task switching and core migration, without operating system (OS) enabling. In particular, the embodiments of the invention allow accelerators such as synchronous hardware accelerators to save their state in the memory stack, and safely restore their state following various types of processor events (e.g., such as exceptions managed by an exception handler as described below).

In one embodiment, the hardware accelerator invocation is treated as a CALL instruction in which the accelerator may consume an area on the user's stack to maintain its state. When an exception and/or interrupt forces the accelerator to pause, this state is automatically persistent, and is available when the accelerator is resumed following the exception handler, context switch and/or core migration. In the latter case, the hardware accelerator resuming the computation may be a different one (associated with the new core). In such a case, the new core may access the saved state within the stack (e.g., from memory or a shared cache).

In one embodiment, the synchronous accelerator is treated like a library function which is invoked, uses the stack following invocation, and then releases this portion of the stack when completed (behaving like a function call). In one embodiment, when the accelerator is invoked, the stack pointer is moved to work with the invoked accelerator's local variables. When the invocation is complete, the stack pointer is returned to the place that it originally was so that caller can start where it left off when the call occurred. In one embodiment, in the even that an exception handler is invoked, the program's stack pointer is adjusted to reflect the accelerator's stack usage, thereby ensuring that the exception handler does not modify the accelerator's save area.

Figure 10B:
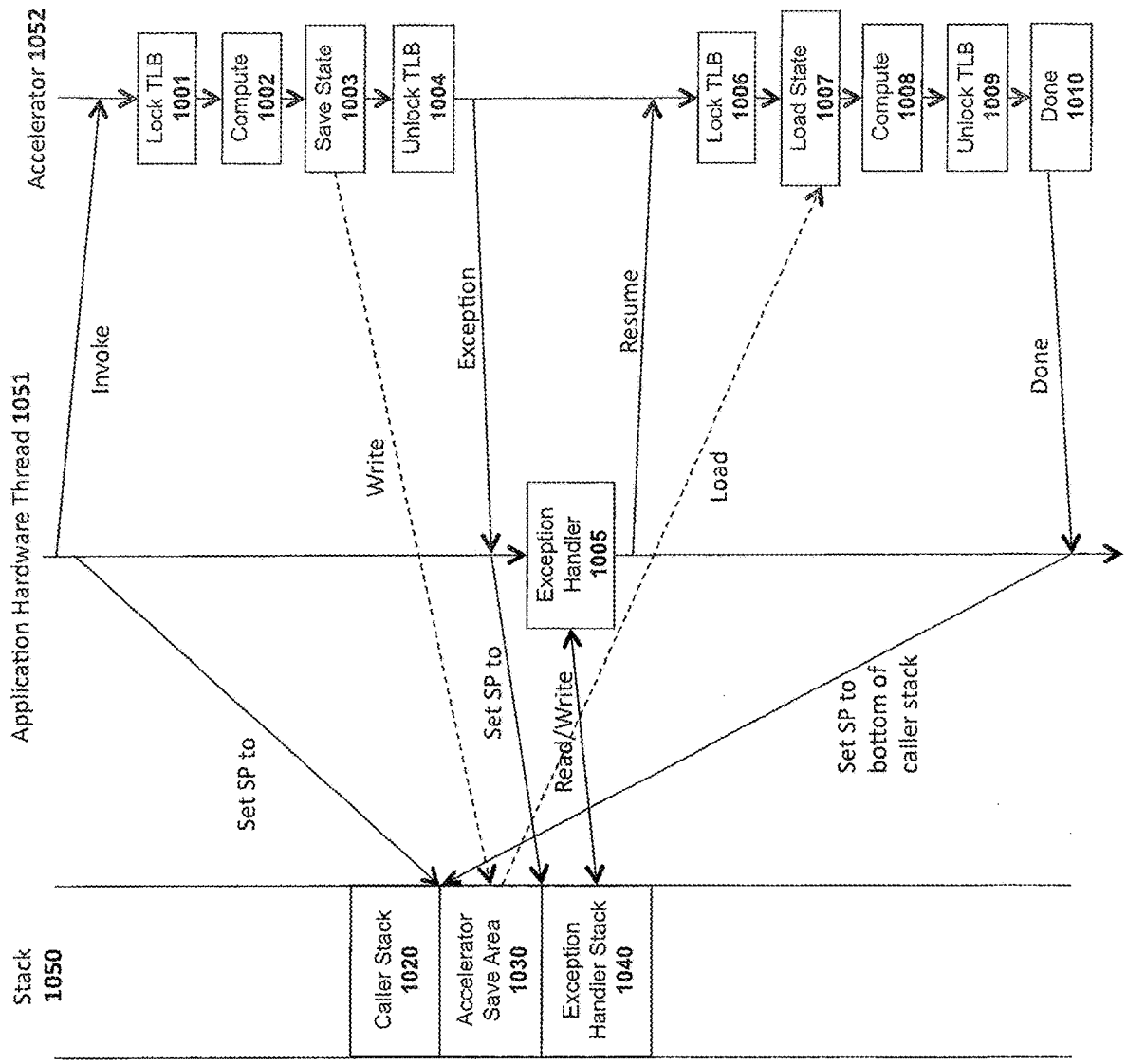
FIG. 10B illustrates one embodiment of the invention which uses a stack for storing accelerator state information.

One embodiment of the invention is illustrated in FIG. 10B which shows a hardware stack 1050 in memory, an application hardware thread 1051, and an accelerator thread 1052. The particular stack 1050 illustrated in FIG. 10B includes a caller stack area 1020 for storing data associated with the execution of the application hardware thread 1051; an accelerator save area 1030 for storing data associated with the execution of the accelerator thread 1052; and an exception handler stack area 1040 for storing data associated with the execution of an exception handler 1005.

In one embodiment, during the execution of the application hardware thread, an accelerator function is invoked. In response, the stack pointer is adjusted to point to the top of the accelerator save area 1030 and the entries in the translation lookaside buffer (TLB) associated with the accelerator save area 1030 are locked at 1001. One reason for doing so is that if an exception occurs and the accelerator saves its state (be it on the stack or in a another designated memory area), it is desirable to avoid an additional page fault which would convert the original exception into a double one. One way to avoid this is to lock the TLB page entry (or entries) for the accelerator save area 1030 when the accelerator begins work, thereby ensuring that no such page fault will be generated. The OS can still mark the page as unavailable, but it is forced to defer physically evicting it until the next context switch (when the thread isn't running at all, and the accelerator state is safely saved). On return from the context switch, the accelerator re-acquires the TLB page entries (which may point at a different physical locations), load the state, and continue. A large accelerator save area may span multiple TLB pages (in extreme cases, dozens of 4k pages). The number of TLB entries that need to be locked can be reduced by using large pages (e.g., 64k pages).

At 1002, the accelerator performs operations based on to the command which it is executing and, at 1003, saves its current state to the accelerator save area 1030 within the stack 1050. It then unlocks the TLB 1004 (which had been locked at 1001 to avoid an additional page fault as described above). As illustrated, an exception event is detected, which is passed to an exception handler 1005 executed within the application hardware thread 1051. During execution, the execution handler may read/write using a portion 1040 of the stack 1050 (i.e., it uses the exception handler stack 1040 to store intermediate state information during the handling of the exception condition). Once the exception handler has completed its operations, it allows the accelerator thread 1052 to resume.

At 1006 the accelerator again locks the TLB (for the same reasons as stated above) and, at 1007, it loads the state which had previously been stored to the accelerator save area 1030. Note that, at this stage, the accelerator thread 1052 may, in fact, be executed on different core or processor than the first portion of the accelerator thread (operations 1001-1004). In such a case, it may simply load the saved accelerator state from the accelerator save area 1030 which may be physically located in a shared memory or cache. It then completes it's thread of execution at 1008, unlocks the TLB at 1009 and completes at 1010. Control is then transferred back to the application hardware thread 1051, which resets the stack pointer to the top of the accelerator save area 1030 (i.e., where it left off when it began execution of the accelerator thread 1052).

It will be appreciated that various modifications to the specific details provide above may be implemented while still complying with the underlying principles of the invention. For example, in one embodiment, a specific memory region may be designated for the accelerator to hold its state in (rather than using the stack). In this case there is no need to modify the program's stack pointer for the exception handler.

In either embodiment, the techniques described herein allow accelerators to work transparently when the invoking thread is migrated between (symmetrical) cores; the accelerator on one core saves its state to memory, and when the thread is scheduled on another core, the accelerator there loads the data from memory (e.g., via a shared common cache for efficiency). Thus, the embodiments of the invention described herein allow an accelerator to transparently save its state and ensure forward progress in the presence of exceptions, context switches and/or core migrations, without OS enabling (e.g., without modifying XSAVE/XRESTORE and/or adding architectural registers). This, in turn, permits the use of accelerator forms that previously required the addition of new architectural registers and OS enabling via modified XSAVE. Processors using such accelerators realize improved performance and reduced development costs.

Hybrid Latency and Throughput Processor Core Architecture

The embodiments of the invention below define a hybrid processor core architecture in which a single program can contain both latency and throughput components. In one embodiment of the invention, the main application executes on the latency optimized clusters (as is done today) and the throughput parts are coded as a part of the main program (i.e., using the same instruction set architecture (ISA)), and executed on new throughput-optimized hardware clusters. In one embodiment, commands are invoked on the throughput-optimized hardware by way of an instruction such as XCALL described above. However, the underlying principles of the invention are not limited to this particular implementation.

Figure 11A:
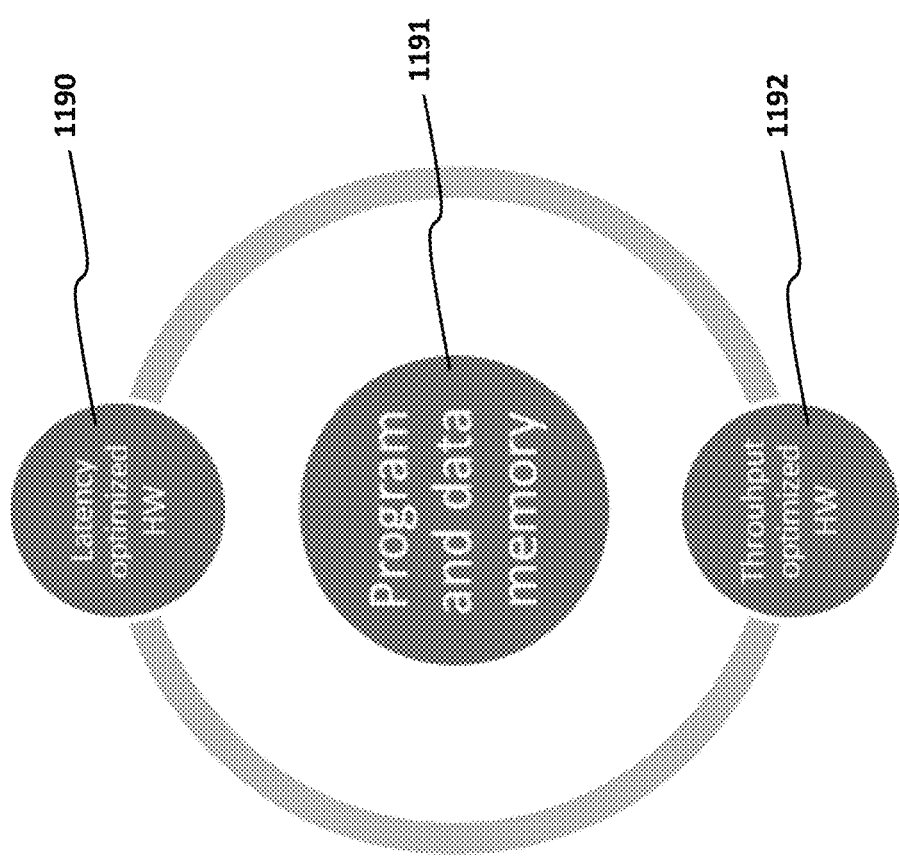
FIG. 11A illustrates a high level of program and data memory processed by latency optimized hardware and throughput optimized hardware.

FIG. 11A illustrates a very high level architecture of one embodiment in which program and data memory 1191 is shared between a latency-optimized hardware component 1190 and a throughput-optimized hardware component 1192. In one embodiment, the throughput optimized hardware comprises one or more accelerator components which are co-processors or functional units for performing specialized data processing operations (e.g., vector/SIMD operations, graphics operations, sort and loop operations, etc). The underlying principles of the invention, however, are not limited to any particular type of throughput optimized hardware components.

The latency optimized hardware components 1190 and throughput optimized hardware components 1192 may be logical units within the same processor chip or core. Alternatively, the latency optimized hardware components 1190 may be on one chip and the and throughput optimized hardware components 1192 may be on a different chip (either in the same semiconductor package or on different packages) and connected via a communication bus (e.g., such as a PCI Express, Direct Media Interface (DMS) or other type of communication bus). In yet another embodiment, some of the throughput optimized hardware components 1192 may be on the same chip or core as the latency optimized hardware components 1190, while other throughput optimized hardware components 1192 may be on a different chip or core. The embodiments of the invention described herein are not limited to any particular chip/packaging configuration and supports implementations with multiple different types of latency optimized hardware components 1190 and throughput optimized hardware components 1192.

In one embodiment, the transfer of control between the latency-optimized hardware 1190 and the accelerated/throughput-oriented hardware 1192 is done under explicit application control. That is, a specific instruction triggers the throughput-optimized hardware 1192 which, in turn, invokes the application-provided throughput code. The throughput optimized hardware 1192 of one embodiment is responsible for scheduling multiple concurrent instances of the throughput code, in separate concurrent hardware micro-architectural threads (μThreads).

In one embodiment, from the point of view of the operating system, the application is executing on a single thread, regardless of whether it is running on the latency-optimized hardware in multiple μThreads or on the throughput-optimized hardware, maintaining the illusion that the program as a whole is one single thread to the operating system. Transfer of control between the latency and throughput hardware is transparent, without context switches, middleware intervention, core migration etc.

Figure 11B:
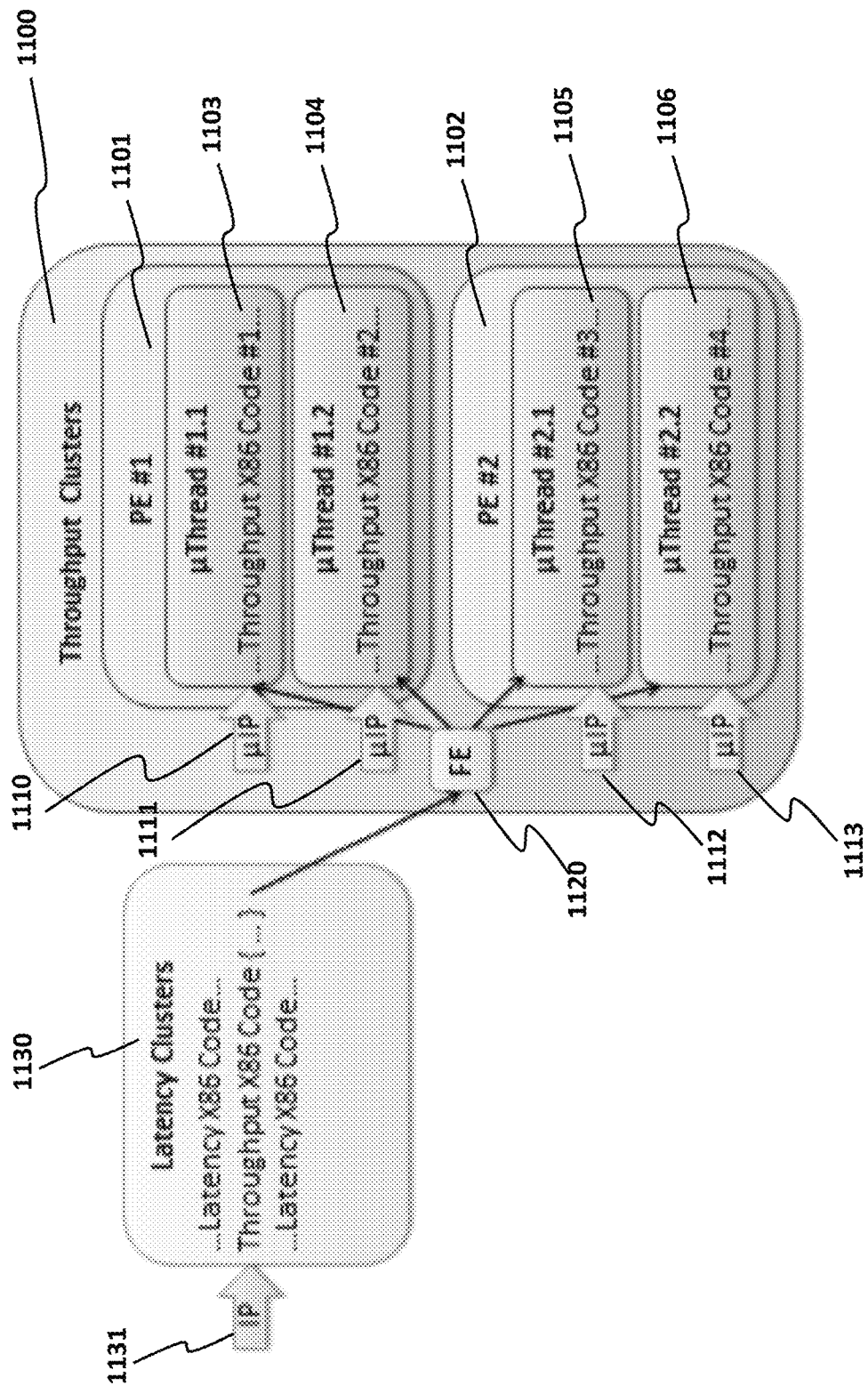
FIG. 11B illustrates one embodiment of the invention comprising a set of latency clusters and a set of throughput clusters.

As illustrated in FIG. 11B, in one embodiment, the main program code is executed on a set of latency clusters 1130 (i.e., latency-oriented functional units such as x86 functional units). A primary instruction pointer 1131 identifies the current point of execution for the main instruction stream. As indicated, in one embodiment, the main instruction stream comprises x86 program code. However, the underlying principles of the invention are not limited to an x86 implementation.

In one embodiment, the throughput program code is included with the latency program code as illustrated. In response to detecting the need to execute the throughput code, one embodiment of the invention triggers a front end unit 1120 of a set of throughput clusters 1100 which distributes the throughput code to be executed by a set of processor elements 1101-1102. By way of example, and not limitation, the XCALL instruction mentioned above may trigger the front end unit 1120 to retrieve a command from the command register and parameters from the parameter register and distribute the command for execution by one or more processor elements 1101-1102.

In the example shown in FIG. 11B, two processor elements are illustrated, PE #1 1101 and PE #2 1102. Processor element 1101 is concurrently executing two μThreads 1103-1104 (μThread #1.1 and μThread #1.2) and processor element 1102 is concurrently executing two μThreads 1105-1106 (μThread #2.1 and μThread #2.2). Thus, in this embodiment, each of the processor elements 1101-1102 are capable of simultaneous multithreading (i.e., simultaneously executing multiple μThreads). In one embodiment, each of the μThreads 1103-1106 comprises a series of micro-operations or μops and includes its own micro-instruction pointer (μIP) 1110-1113, respectively, used by each processor element 1101-1102 to maintain the current point of μThread execution.

The processor elements 1101-1102 may be homogeneous (each capable of executing any one of the μThreads 1103-1106) or heterogeneous (each designed to execute specific types of μops). For example, one processor element 1101 may include functional units for executing sort or loop operations while another processor element 1102 may include functional units for executing graphics operations. Of course, the underlying principles of the invention are not limited to any specific set of processor elements.

The hybrid processor core architecture illustrated in FIG. 11B allows the use of the same instruction set architecture (ISA) to code the throughput portions of the application (in contrast to current implementations where throughput program code is developed in specialized programming languages and ISAs such as for DSPs and GPUs). Consequently, the same ISA and tool-chain is used for both the latency and throughput parts and the complete application can be developed naturally as a single program.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 14A-14B are block diagrams illustrating a generic vector friendly instruction format and instruction templates thereof according to embodiments of the invention. FIG. 14A is a block diagram illustrating a generic vector friendly instruction format and class A instruction templates thereof according to embodiments of the invention; while FIG. 14B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

Figure 12A:
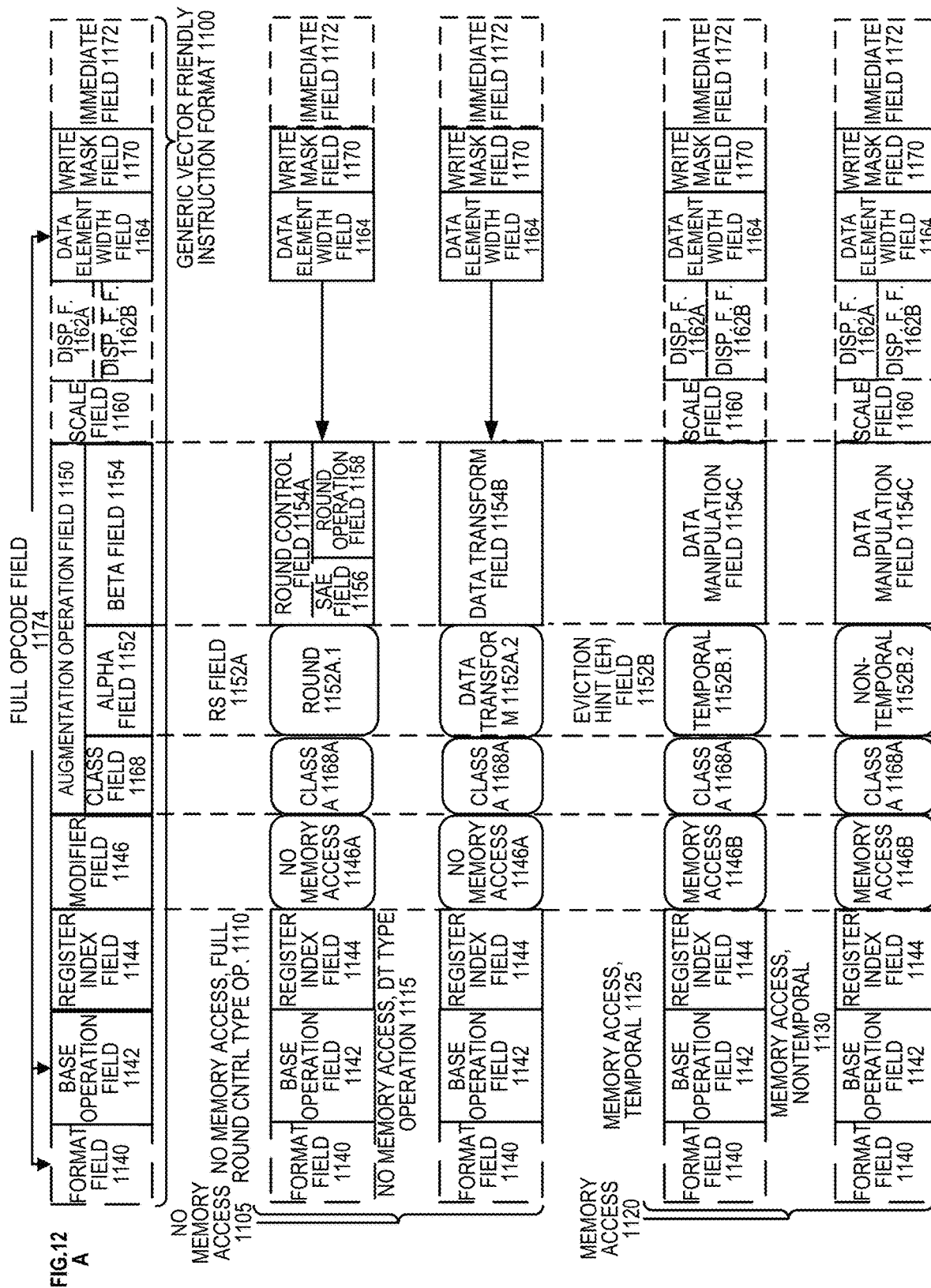

The class A instruction templates in FIG. 12A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 12A-12B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access (e.g., memory access 1146B) from those that do not (e.g., no memory access 1146A); that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*index+base$).

Displacement Field 1162A—its content is used as part of memory address generation (e.g., for address generation that uses $2^{scale}*index+base+displacement$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 12A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE)

1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 13 is a block diagram illustrating an exemplary specific vector friendly instruction format according to embodiments of the invention. FIG. 13 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 13A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]—R), EVEX.X bit field (EVEX byte 1, bit [6]—X), and 1157BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0F, 0F 38, or 0F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]—U)—If EVEX.U=0, it indicates class A or EVEX.U0; if EVEX.0=1, it indicates class B or EVEX.U1.

Prefix encoding field 1225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 1154 (EVEX byte 3, bits [6:4]—SSS, also known as EVEX.$s_{2-0}$, EVEX.$r_{2-0}$, EVEX.rrl, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte 1250 (Byte 6)—As previously described, the content of SS field 1252 is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1172 operates as previously described.

Full Opcode Field

FIG. 13B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 13C is a block diagram illustrating the fields of the specific vector friendly instruction format 1200 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 13D:
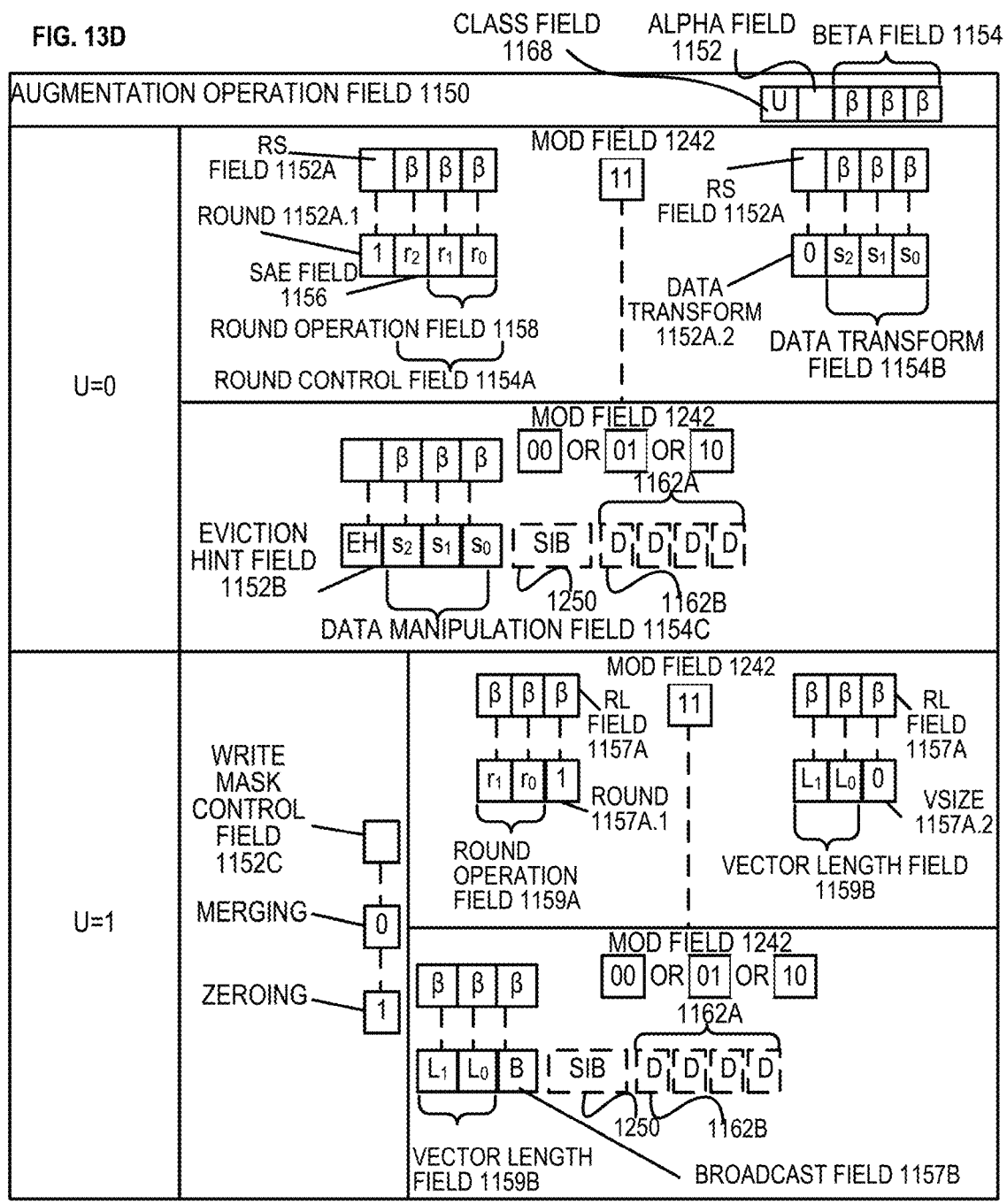

FIG. 13D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]—EH) is interpreted as the rs field 1152A. When the rs field 1152A contains a 1 (round 1152A.1), the beta field 1154 (EVEX byte 3, bits [6:4]—SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]—SSS) is interpreted as a three bit data transform field 1154B. When U=0 and the MOD field 1242 contains 00, 01, or 10 (signifying a memory access operation), the alpha field 1152 (EVEX byte 3, bit [7]—EH) is interpreted as the eviction hint (EH) field 1152B and the beta field 1154 (EVEX byte 3, bits [6:4]—SSS) is interpreted as a three bit data manipulation field 1154C.

When U=1, the alpha field 1152 (EVEX byte 3, bit [7]—EH) is interpreted as the write mask control (Z) field 1152C. When U=1 and the MOD field 1242 contains 11 (signifying a no memory access operation), part of the beta field 1154 (EVEX byte 3, bit [4]—$S_0$) is interpreted as the RL field 1157A; when it contains a 1 (round 1157A.1) the rest of the beta field 1154 (EVEX byte 3, bit [6-5]—$S_{2-1}$) is interpreted as the round operation field 1159A, while when the RL field 1157A contains a 0 (VSIZE 1157.A2) the rest of the beta field 1154 (EVEX byte 3, bit [6-5]—$S_{2-1}$) is interpreted as the vector length field 1159B (EVEX byte 3, bit [6-5]—$L_{1-0}$). When U=1 and the MOD field 1242 contains 00, 01, or 10 (signifying a memory access operation), the beta field 1154 (EVEX byte 3, bits [6:4]—SSS) is interpreted as the vector length field 1159B (EVEX byte 3, bit [6-5]—$L_{1-0}$) and the broadcast field 1157B (EVEX byte 3, bit [4]—B).

FIG. 14 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 12A; U = 0) | 1110, 1115, 1125, 1130 | zmm registers (the vector length is 64 byte) |
| | B (FIG. 12B; U = 1) | 1112 | zmm registers (the vector length is 64 byte) |
| Instruction Templates that do include the vector length field 1159B | B (FIG. 12B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

An Exemplary Computer System

Figure 15:
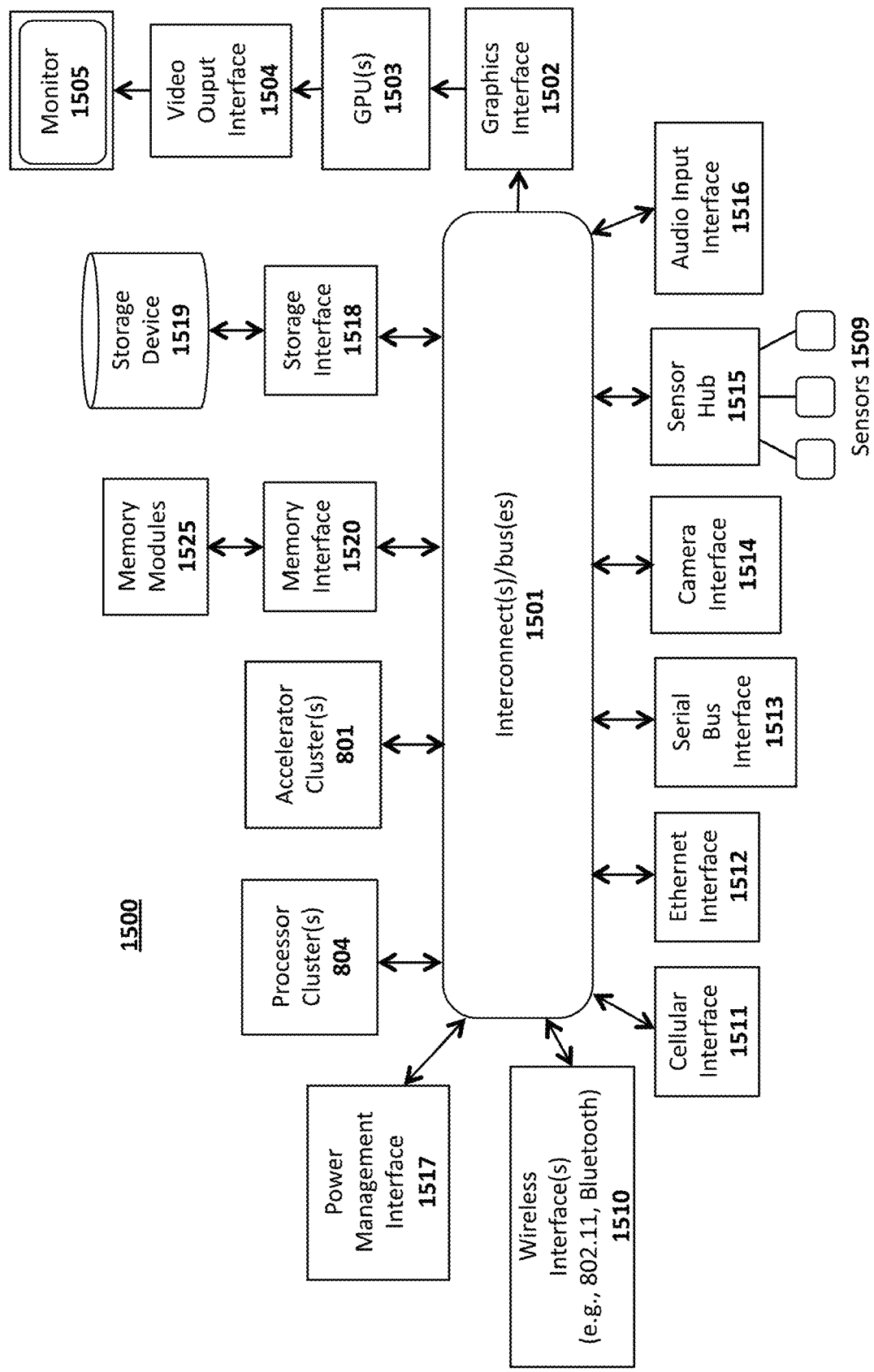
FIG. 15 illustrates a computer system in accordance with certain embodiments of the invention.

FIG. 15 is a block diagram illustrating an exemplary clients and servers which may be used in some embodiments of the invention. It should be understood that while FIG. 15 illustrates various components of a computer system 1500, it is not intended to represent any particular architecture or manner of interconnecting the components as such details are not germane to the embodiments of the invention. It will be appreciated that other computer systems that have fewer components or more components may also be used with the embodiments of invention.

As illustrated in FIG. 15, the computer system 1500, which is a form of a data processing system, includes the interconnect(s)/bus(es) 1501 communicatively coupling the processor cluster(s) 804 to the various other system components. The interconnects/buses may include various levels of interconnection which may be connected to each other through various bridges, controllers, and/or adapters as is well known in the art. By way of example, the interconnect(s) 1501 may include a quick path interconnect (QPI) component, a Peripheral Component Interconnect Express ("PCI Express") component, or other technologies for interconnecting the various components to the processor cluster(s) 804. The underlying principles of the invention are not limited to any particular interconnects or buses.

Although illustrated as a separate component in FIG. 15, the accelerator(s) 801 may be integrated within the processor cluster(s) 804. Alternatively, some accelerator(s) may be integrated within the processor cluster(s) and some may be connected to the computer system via the interconnect(s)/bus(es). As described in detail above, the accelerators are adapted to efficiently execute certain types of program code (e.g., vector/SIMD operations, graphics operations, sort and loop operations, etc). By way of example, the general purpose processor clusters 804 may include execution logic within a processor core for executing general purpose instructions such as x86 instructions including instructions which invoke commands on the accelerator clusters 801. The underlying principles of the invention, however, are not limited to any particular type of general purpose clusters or accelerator clusters.

The embodiment illustrated in FIG. 15 also includes a memory interface 1520 for coupling memory modules 1525 computer system. In one embodiment, the memory modules 1525 are dual in-line memory modules (DIMMs) such as random access memory (RAM) modules and the memory interface may generate the electrical signaling required to access the memory modules 1525 (e.g., such as column address strobe (CAS), row address strobe (RAS), write enable (WE), and output enable (OE) signals).

In one embodiment, the memory interface 1520 comprises logic and circuitry for interfacing with different types of memory modules including volatile memory modules such as RAM and non-volatile memory modules such as Phase-Change Memory (PCM), also sometimes referred to as phase change random access memory (PRAM or PCRAM), PCME, Ovonic Unified Memory, or Chalcogenide RAM (C-RAM). For example, one embodiment of the computer system 1500 implements a two-level (2L) memory hierarchy comprising a "near memory" portion which may be a volatile memory such as RAM and a "far memory" portion which may be implemented as a Phase-Change Memory (PCM). In such a case, the memory interface may include the logic and circuitry required to access both memory types.

The illustrated embodiment 1500 also includes one or more storage interfaces 1518 for interfacing with storage devices such as hard drives or other non-volatile storage devices. In one embodiment, the storage interface 1518 comprises a serial ATA storage interface and the hard drive comprises a solid state drive (SSD) or a magnetic storage device. In an embodiment of the invention which uses 2LM memory (as discussed above), a portion of the storage on the storage device 1519 may be used for "far memory" (or a portion of "far memory").

The illustrated embodiment 1500 also includes a graphics interface 1502 for interfacing with one or more graphics processing units 1503. The GPUs may be embedded on a motherboard of the computer system or on a separate card inserted in the motherboard (e.g., via a PCI express graphics interface, or other high speed graphics interface). A video output interface 1504 such as a digital video interface (DVI), High-Definition Multimedia Interface (HDMI), or DisplayPort video output interface outputs a video stream to a monitor 1505 which renders video for the end user. As mentioned, the GPUs may be implemented as accelerator components for executing graphics program code using any of the embodiments described herein.

The illustrated embodiment 1500 also includes an audio input interface 1516 for receiving multiple digital and analog audio inputs. For example, a microphone may be coupled to one of the audio input interfaces to capture the user's voice (e.g., during Web chats, phone calls, or for recording audio). Additionally, a digital audio input may be used such as a Toslink interface.

The illustrated embodiment 1500 also includes a sensor hub 1515 for collecting data from various different system sensors 1509. By way of example, and not limitation, the sensors 1509 may include mechanical sensors, motion sensors, and location sensors to detect a position and orientation of the computer system 1500. For example, in one embodiment, the sensors may include multi-axis accelerometers for detecting acceleration values along the X, Y, and Z axes and reporting to the data to the sensor hub. The sensor hub may then perform calculations to determine a current orientation of the computer system 1500. For example, if the computer system is a notebook computer, the sensor hub may detect a current position of the computer monitor. The sensors 1509 may also include inertial sensors for detecting displacements from a reference location and/or proximity sensors for detecting proximity to a user or other device. In one embodiment, the sensors 1509 include a global positioning system (GPS) sensor or other sensor for determining the current global position of the computer system. The sensors 1509 may also include a magnetometer for detecting the orientation of the Earth's electric field (i.e., to determine a current position of the computing system relative to North). The sensors 1509 may also include a gyro for detecting changes in orientation and an ambient light sensor for detecting current lighting conditions (e.g., so that the sensor hub or other system component may responsively adjust the brightness of the monitor 1505).

All of the data collected from the various sensors 1509 may be used to determine a current mode of operation and responsively adjust operation of the computing device 1500. For example, in response to the signals from the sensors 1509 the computing device may enter into a first mode of operation in which in which the accelerator invocations described herein are enabled and a second mode of operation in which the accelerator invocations described herein are disabled.

The illustrated embodiment 1500 also includes a camera interface 1514 for coupling to a video camera usable to capture motion video and still pictures. For example, in one embodiment, the camera interface 1514 gathers motion video for video conferencing applications in which the accelerator invocation techniques described herein may be used. For example, one accelerator may be configured to efficiently encode video streams into the H.264/MPEG-4 AVC format. It should be noted, however, that the underlying principles of the invention are not limited to any particular video compression format.

The illustrated embodiment 1500 also includes a serial bus interface 1513 for establishing serial data communication with connected devices (e.g., mobile phones, tablets, printers, external cameras, MIDI devices, etc). This embodiment further includes an Ethernet interface 1512 for establishing network connections over an Ethernet network and a cellular interface 1511 for establishing voice and data connections over a cellular network using cellular communication protocols. Various cellular technologies may be employed including, but not limited to 3rd Generation Partnership Project technologies (e.g., 3GPP2) code division multiple access technologies (e.g., CDMA2000 technology using 1×RTT/EVDO/eHRPD); Long Term Evolution (LTE) technology and/or LTE-Advanced (LTE-A) technology; and Universal Mobile Telecommunications System (UMTS) technology such as WCDMA/TDSCDMA. In addition, the embodiment shown also includes a WiFi and/or Bluetooth interface 1510 for establishing communication over WiFi channels (e.g., 802.11 channels) and/or Bluetooth channels, respectively. Each of the Ethernet, Cellular, and WiFi communication interfaces include a transceiver and other circuitry for generating analog transmission signals using the appropriate technology. In one embodiment, an accelerator may also be invoked to support the network communication process (e.g., for performing network baseband functions such as data encoding).

The illustrated embodiment 1500 also includes a power management interface 1517 for detecting current conditions within the computer system (e.g., thermal, power usage, battery life, etc) and responsively adjusting power usage to each of the different system components. For example, under certain conditions, the the power management interface 1517 may turn off the accelerator functions described herein to conserve power (e.g., when the battery drops below a threshold value).

The illustrated embodiment 1500 also includes a power management interface 1517 may also include various different types of Input/Output devices such as a cursor control (e.g., mouse, touchscreen, touchpad, etc.), a keyboard, etc.) for receiving user input.

It will be appreciated that additional components, not shown in FIG. 15, may also be a part of the data processing system 1500 in certain embodiments of the invention, and in certain embodiments of the invention fewer components than shown in FIG. 15 may be used. In addition, it will be appreciated that one or more buses and/or interconnects, not shown in FIG. 15, may be used to interconnect the various components as is well known in the art.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
    a set of latency clusters to execute a main program code, the main program code comprising both latency program code and throughput program code, wherein a current point of execution in the main program code is identified by a primary instruction pointer;
    a set of throughput clusters comprising one or more processing elements to execute the throughput program code in the main program code; and
    wherein upon detecting the current point of execution for the main program code reaching a first throughput program code in the main program code, a front end unit of the set of throughput clusters is to distribute the first throughput program code to the one or more processing elements in the set of throughput clusters for execution.

2. The apparatus as in claim 1, wherein upon detecting the current point of execution for the main program code reaching a first throughput program code in the main program code, an XCALL instruction is executed by the set of latency clusters to trigger the front end unit to distribute the first throughput program code.

3. The apparatus as in claim 2, wherein the XCALL instruction is to identify a result register to store results of executing the XCALL instruction, a command register to store one or more commands from the first throughput program code to be executed, and a parameter register to store parameters for executing the one or more commands.

4. The apparatus as in claim 3, wherein responsive to executing of the XCALL instruction, the front end unit is to retrieve a first command of the one or more commands from the command register and associated parameters from the parameter register and distribute the first command and the associated parameters for execution by the one or more processing elements.

5. The apparatus as in claim 1, wherein one or more processing elements in the set of throughput clusters are capable of simultaneously multithreading by simultaneously executing multiple micro-threads.

6. The apparatus as in claim 5, wherein each of the micro-threads includes a respective micro-instruction pointer used by the processing elements to maintain a current point of micro-thread execution.

7. The apparatus as in claim 5, wherein one or more processing elements in the set of throughput clusters are homogeneous processing elements, each capable of executing any one of the micro-threads.

8. The apparatus as in claim 5, wherein one or more processing elements in the set of throughput clusters are heterogeneous processing elements, each designed to execute specific types of micro-threads.

9. A method comprising:
 executing a main program code on a set of latency clusters, the main program code comprising both latency program code and throughput program code, wherein a current point of execution in the main program code is identified by a primary instruction pointer; and
 detecting the current point of execution for the main program code reaching a first throughput program code in the main program code and responsively distributing the first throughput program code to one or more processing elements in a set of throughput clusters for execution.

10. The method as in claim 9, wherein responsively distributing the first throughput program code to one or more processing elements in the set of throughput clusters for execution further comprises executing an XCALL instruction by the set of latency clusters.

11. The method as in claim 10, wherein the XCALL instruction is to identify a result register to store results of executing of the XCALL instruction, a command register to store one or more commands from the first throughput program code to be executed, and a parameter register to store parameters for executing the one or more commands.

12. The method as in claim 11, wherein executing the XCALL instruction further comprises:
 retrieving a first command of the one or more commands from the command register and associated parameters from the parameter register; and
 distributing the first command and the associated parameters for execution by the one or more processing elements of the set of throughput clusters.

13. The method as in claim 9, wherein one or more processing elements in the set of throughput clusters are capable of simultaneously multithreading by simultaneously executing multiple micro-threads.

14. The method as in claim 13, wherein each of the micro-threads includes a respective micro-instruction pointer used by the processing elements to maintain a current point of micro-thread execution.

15. The method as in claim 13, wherein one or more processing elements in the set of throughput clusters are homogeneous processing elements, each capable of executing any one of the micro-threads.

16. The method as in claim 13, wherein one or more processing elements in the set of throughput clusters are heterogeneous processing elements, each designed to execute specific types of micro-threads.

\* \* \* \* \*